United States Patent
Park et al.

(10) Patent No.: US 10,425,142 B2
(45) Date of Patent: Sep. 24, 2019

(54) METHOD FOR TRANSMITTING AND RECEIVING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Kijun Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/778,395

(22) PCT Filed: Nov. 23, 2016

(86) PCT No.: PCT/KR2016/013567
§ 371 (c)(1),
(2) Date: May 23, 2018

(87) PCT Pub. No.: WO2017/090987
PCT Pub. Date: Jun. 1, 2017

(65) Prior Publication Data
US 2018/0343046 A1    Nov. 29, 2018

Related U.S. Application Data

(60) Provisional application No. 62/259,027, filed on Nov. 23, 2015, provisional application No. 62/316,545, (Continued)

(51) Int. Cl.
*H04B 7/06* (2006.01)
*H04W 76/27* (2018.01)
(Continued)

(52) U.S. Cl.
CPC ......... *H04B 7/0626* (2013.01); *H04B 7/0456* (2013.01); *H04B 7/06* (2013.01);
(Continued)

(58) Field of Classification Search
CPC .. H04B 7/0626; H04B 7/0632; H04B 7/0639; H04B 7/063; H04B 7/0417;
(Continued)

(56) References Cited

U.S. PATENT DOCUMENTS 8,687,555 B2 * 4/2014 Ko ..................... H04L 1/0026
370/328
2013/0195008 A1    8/2013 Pelletier et al.
(Continued)

FOREIGN PATENT DOCUMENTS

WO    2015060680    4/2015

OTHER PUBLICATIONS

PCT International Application No. PCT/KR2016/013567, Written Opinion of the International Searching Authority dated Feb. 23, 2017, 9 pages.
(Continued)

*Primary Examiner* — Leila Malek
(74) *Attorney, Agent, or Firm* — Lee Hong Degerman Kang & Waimey

(57) ABSTRACT

A method, by which a terminal transmits channel state information in a wireless communication system, comprises a step for performing one integrated CSI process, the step for performing one integrated CSI process comprising the steps of: receiving, from a base station, a first channel state information-reference signal related to a CSI-RS resource which is not pre-coded; reporting, to the base station, a first pre-coding matrix indicator derived on the basis of the first CSI-RS; receiving, from the base station, a second CSI-RS related to one CSI-RS resource of a beam-formed CSI-RS
(Continued)

type; and reporting, to the base station, a second rank indicator/channel quality indicator/second PMI derived on the basis of the second CSI-RS.

12 Claims, 13 Drawing Sheets

Related U.S. Application Data filed on Mar. 31, 2016, provisional application No. 62/415,501, filed on Oct. 31, 2016.

(51) Int. Cl.
*H04B 7/0456* (2017.01)
*H04W 72/04* (2009.01)

(52) U.S. Cl.
CPC ......... *H04B 7/0617* (2013.01); *H04B 7/0632* (2013.01); *H04B 7/0639* (2013.01); *H04W 72/0413* (2013.01); *H04W 76/27* (2018.02)

(58) Field of Classification Search
CPC .. H04B 7/0636; H04B 7/0478; H04B 7/0486; H04B 7/0413; H04B 7/0482; H04L 1/0026; H04L 5/0057

USPC ........................................................ 375/267
See application file for complete search history.

(56) References Cited

U.S. PATENT DOCUMENTS

| | | |
|---|---|---|
| 2015/0055724 A1 | 2/2015 | Onggosanusi et al. |
| 2015/0249511 A1 | 9/2015 | Chen et al. |
| 2016/0156401 A1* | 6/2016 | Onggosanusi ....... H04B 7/0478 370/329 |

OTHER PUBLICATIONS

Samsung, "Discussions on Hybrid CSI-RS based schemes," 3GPP TSG-RAN WG1 #82, R1-154182, Aug. 2015, 4 pages.
European patent application No. 16868883.6, European search report dated Jun. 7, 2019, 10 pages.
NTT DOCOMO, "General Views on Precoding Schemes for Elevation BF and FD-MIMO," 3GPP TSG RAN WG1 Meeting #81, R1-153153, Fukuoka, Japan, May 25-29, 2015, 9 pages.

* cited by examiner

【FIG. 1】
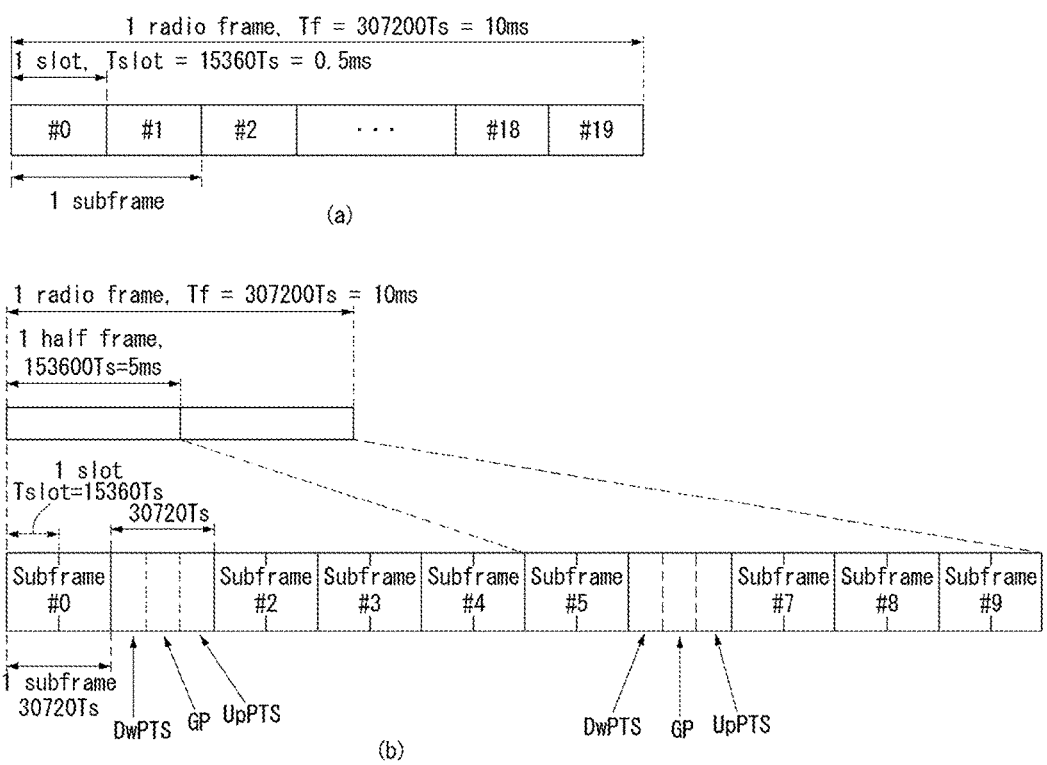

[FIG. 2]
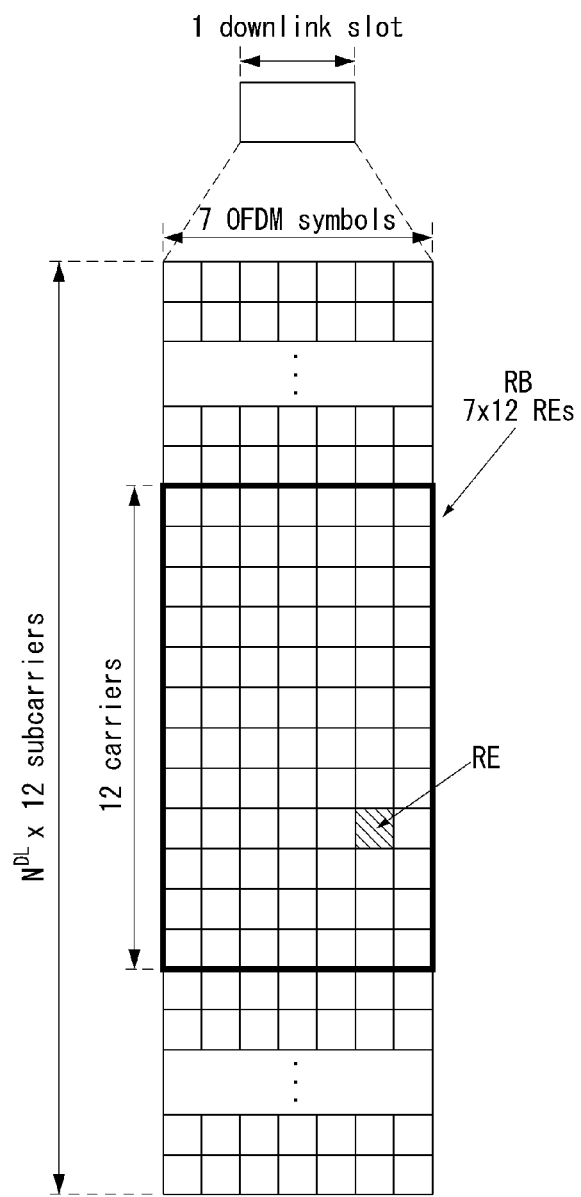

[FIG. 3]
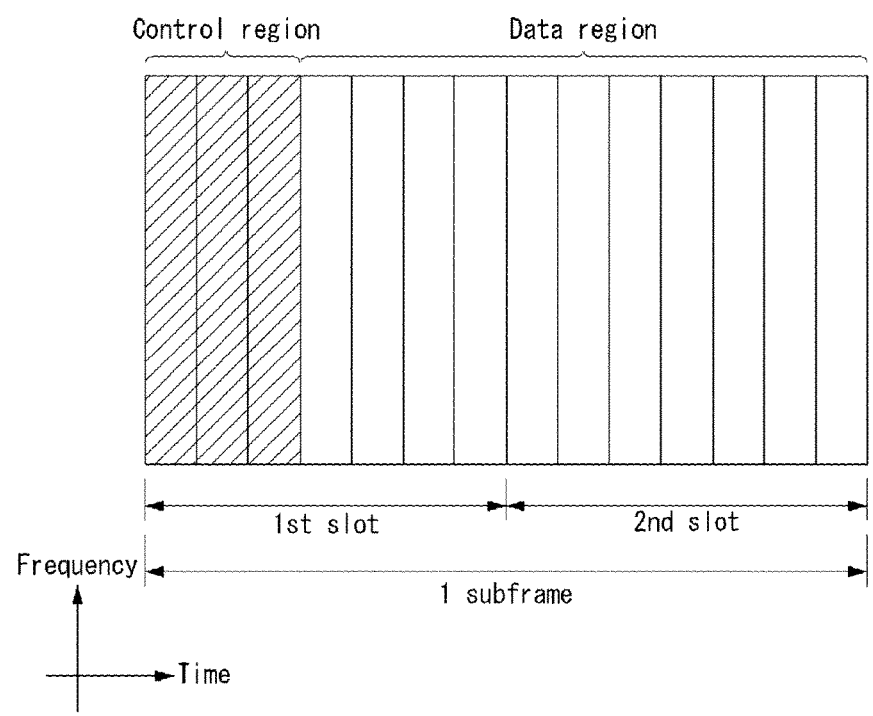

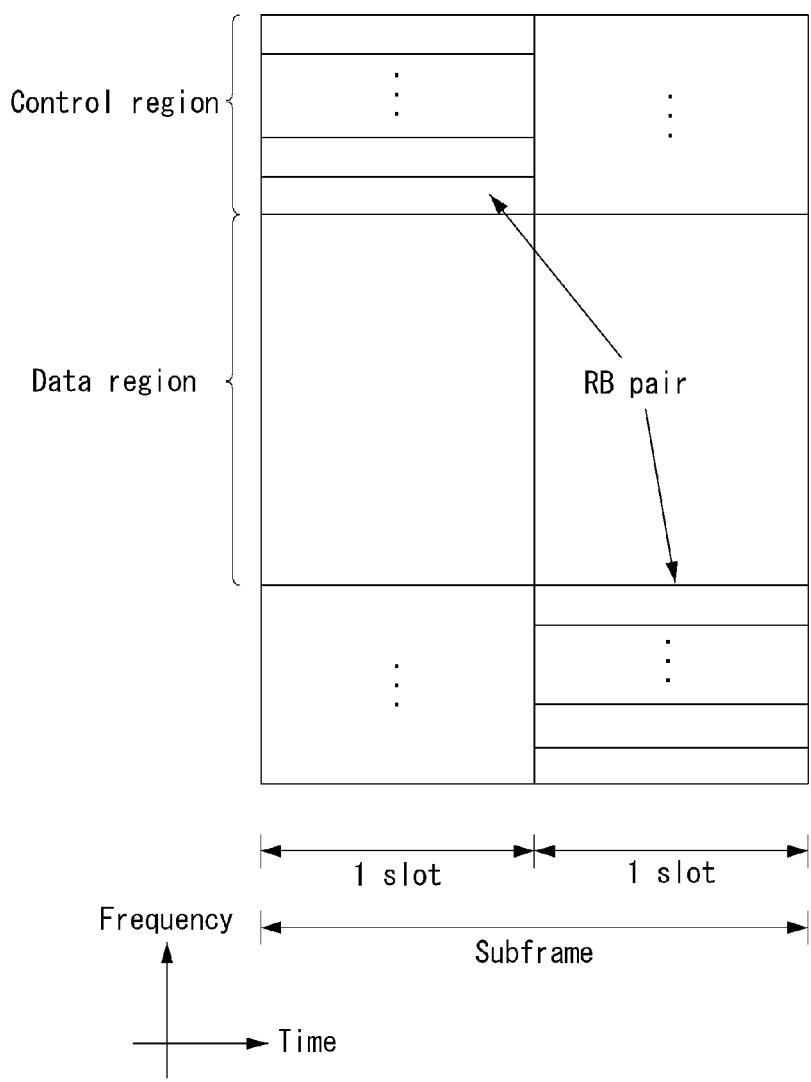
[FIG. 4]

【FIG. 5】
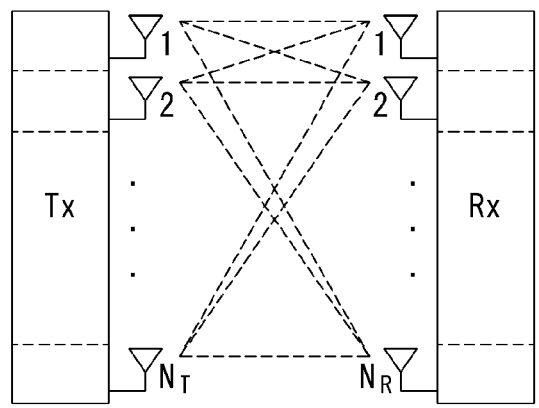
【FIG. 6】
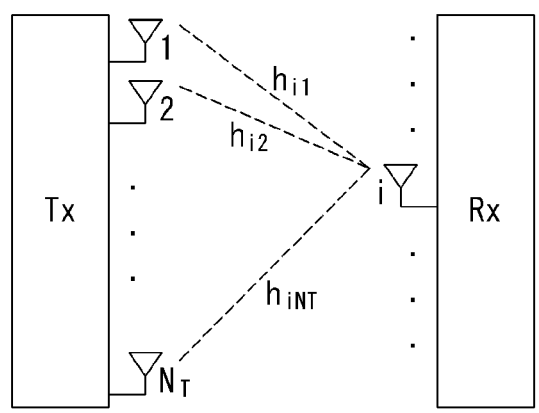

[FIG. 7]
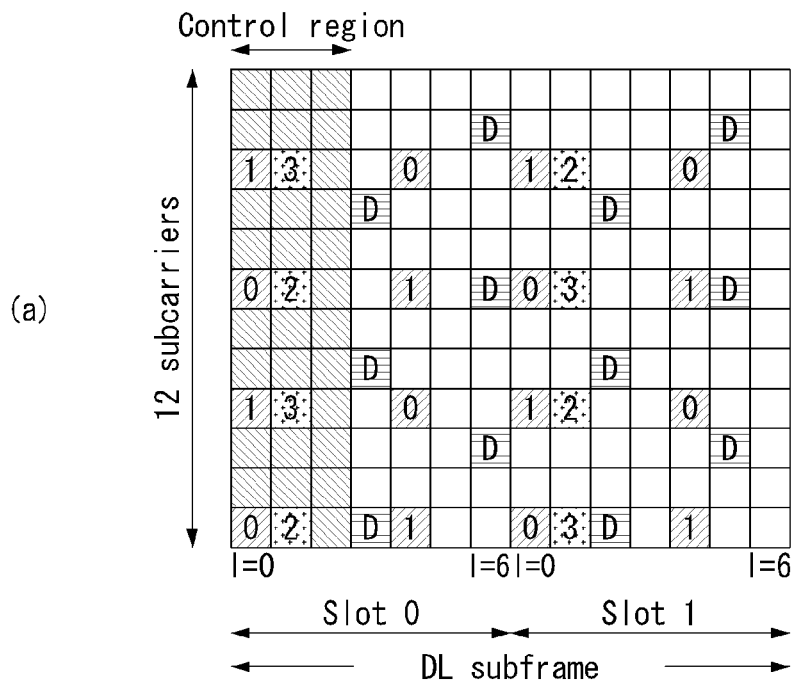
(a)
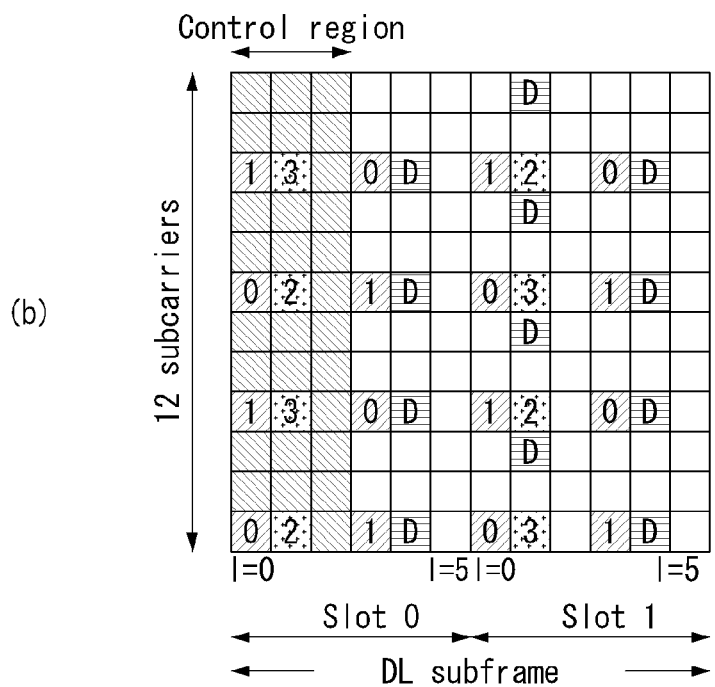
(b)

[FIG. 8]
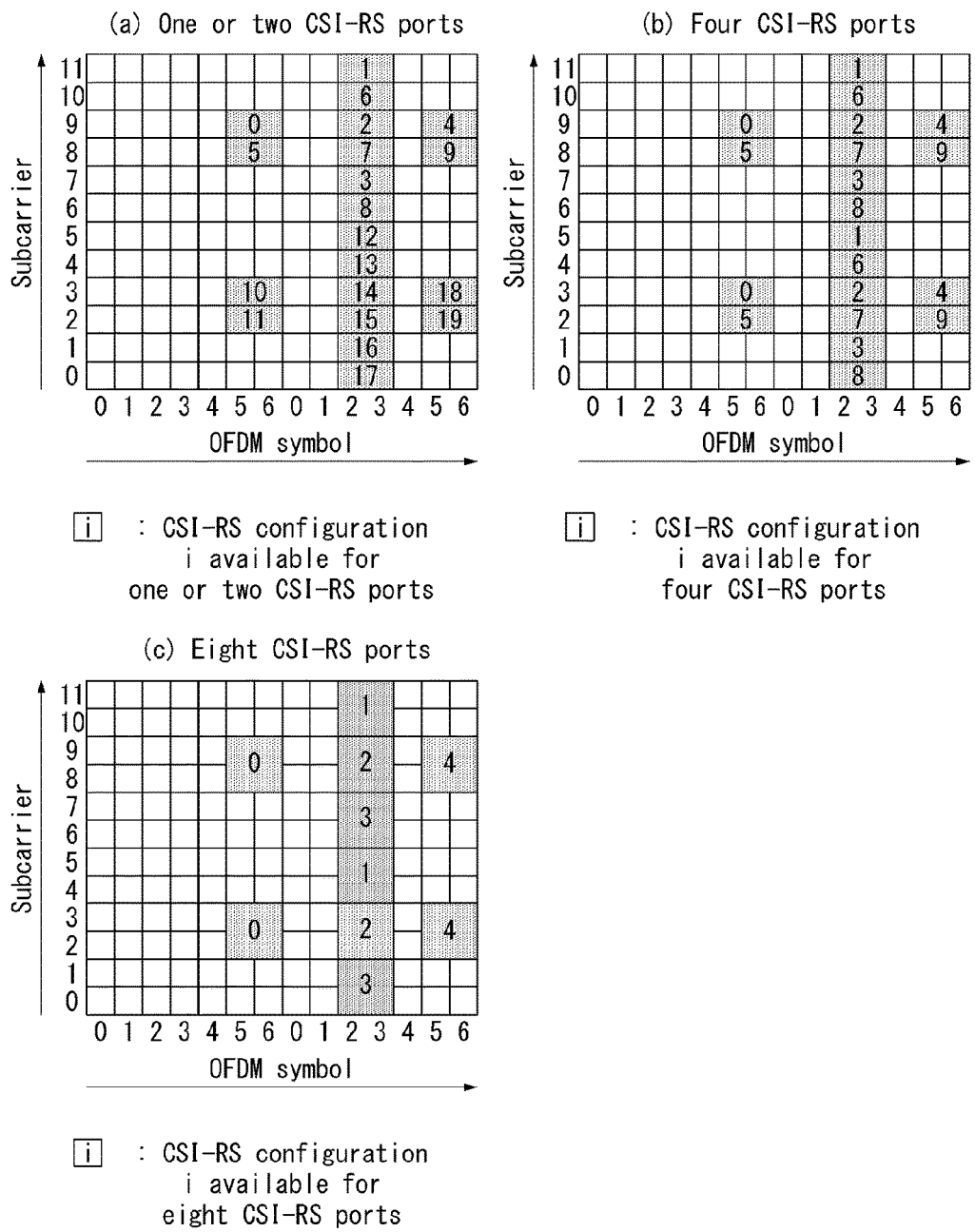

【FIG. 9】
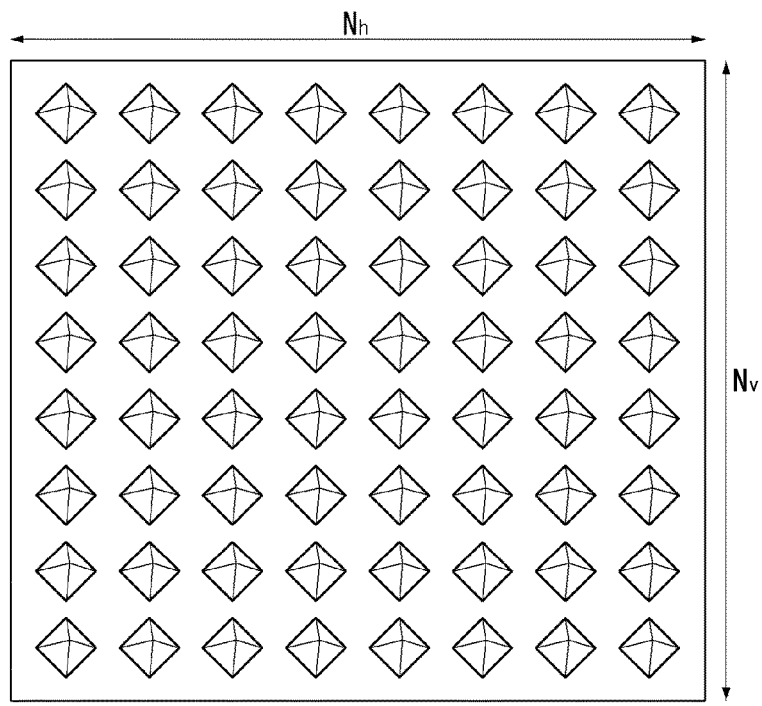
【FIG. 10】
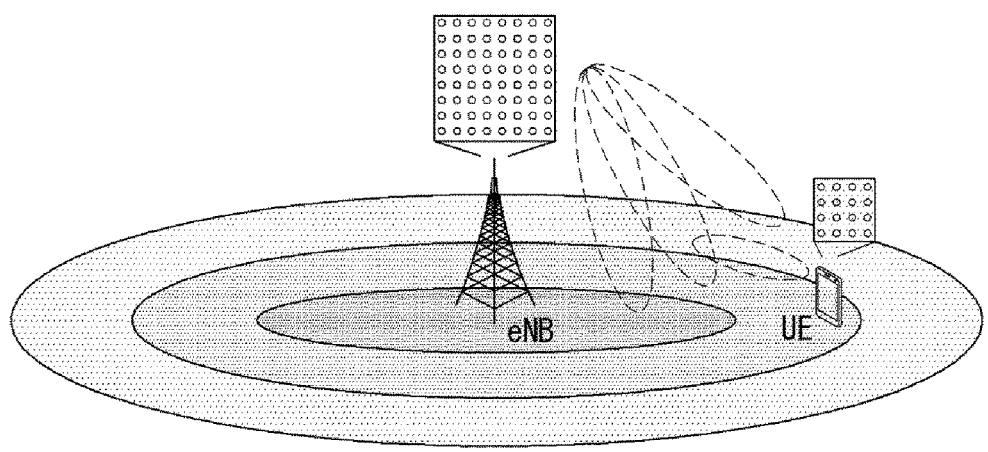

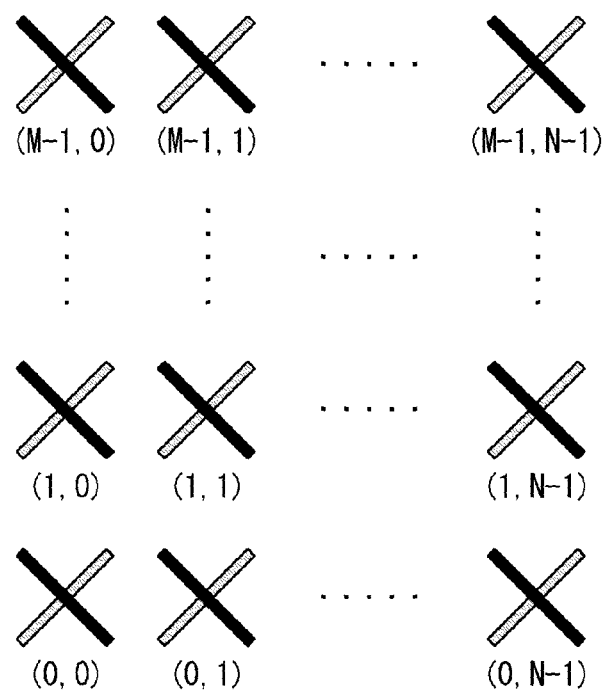
[FIG. 11]

[FIG. 12]
(a)
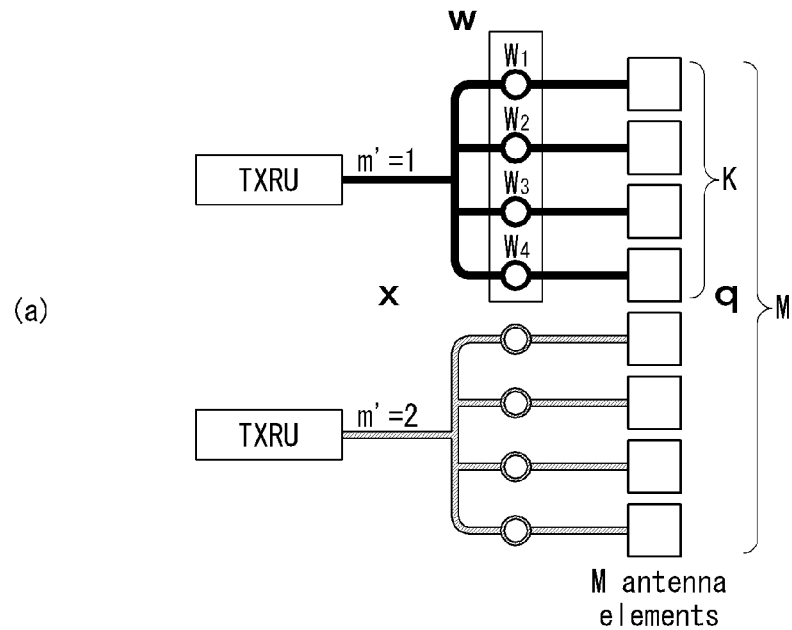
(b)
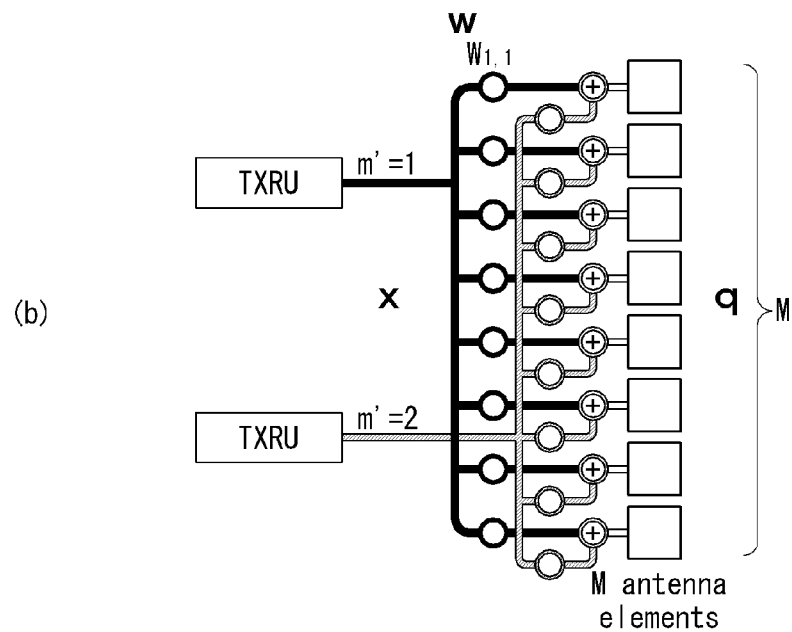

[FIG. 13]
(a) Mode 1-1 with CSI mode 1
Mode 1:
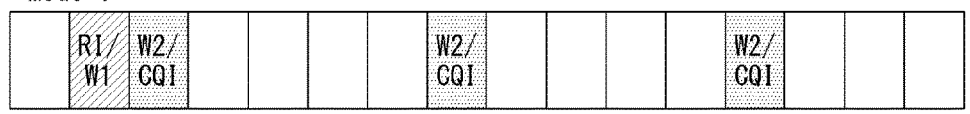
(b) Mode 2-1
Mode 2 (PTI = 0):
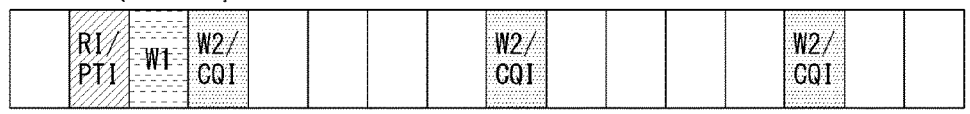
Mode 2 (PTI = 1):
FFS between selection indicator and predefined cycling
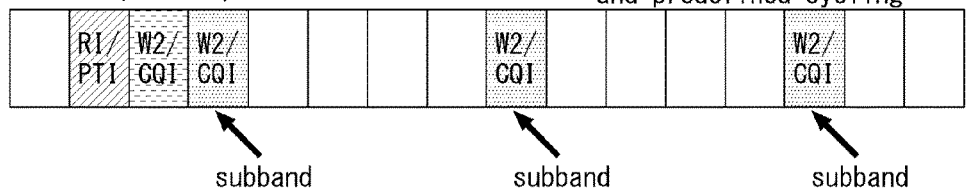
(c) Mode 1-1 with CSI mode 2
Mode 3:
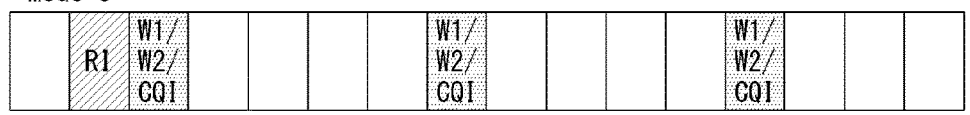

[FIG. 14]
(a)
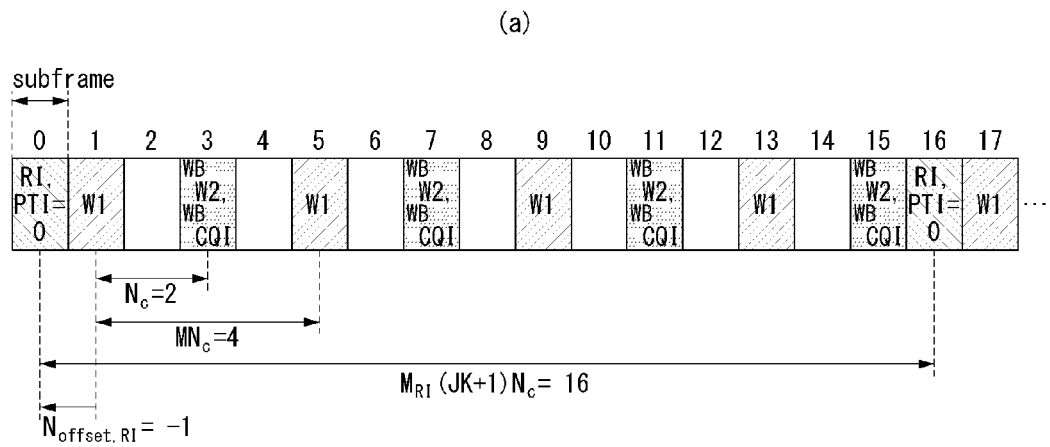
(where M=2, M_RI=2, J=3, K=1)
(b)
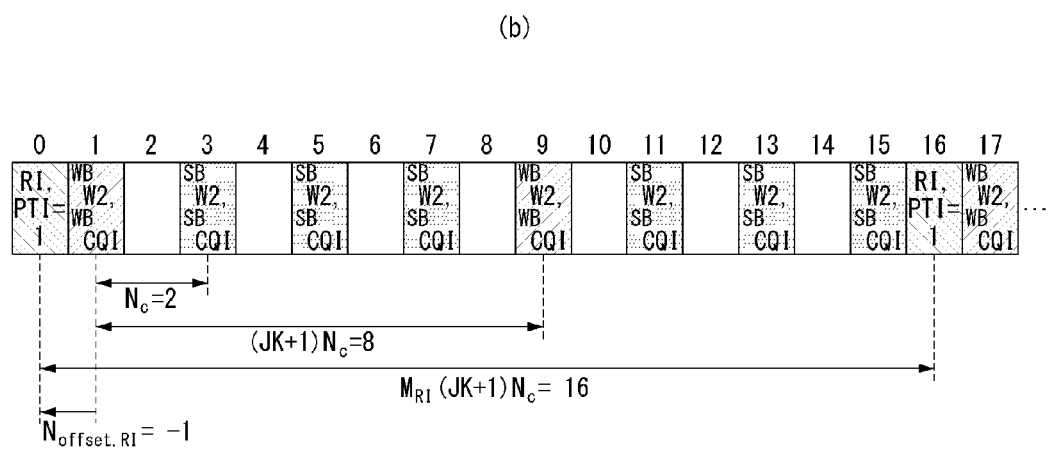
 Report 1   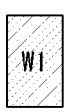 Report 2 w/ PTI=0    Report 3 w/ PTI=0
 Report 2 w/ PTI=1   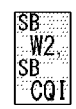 Report 3 w/ PTI=1

[FIG. 15]
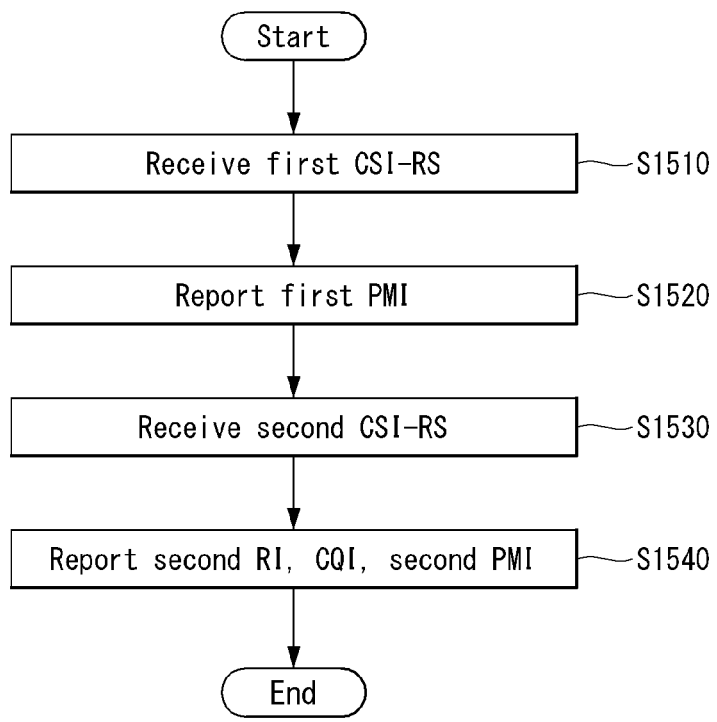
[FIG. 16]
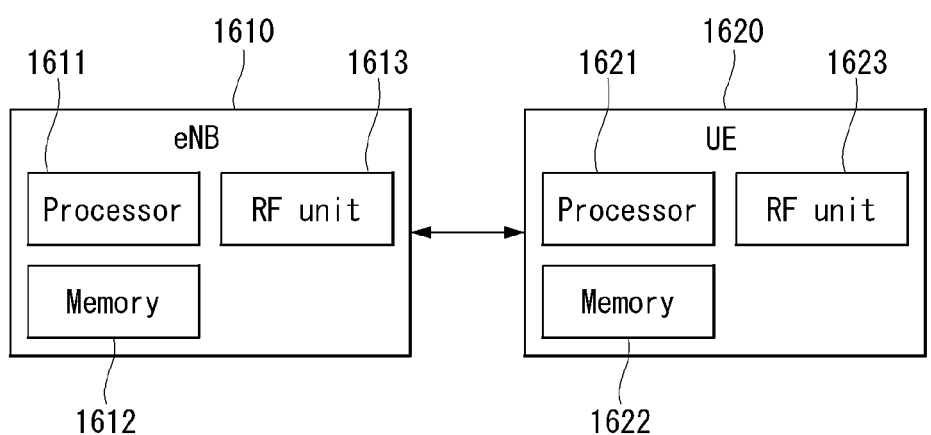

METHOD FOR TRANSMITTING AND RECEIVING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/013567, filed on Nov. 23, 2016, which claims the benefit of U.S. Provisional Application No. 62/259,027, filed on Nov. 23, 2015, 62/316,545, filed on Mar. 31, 2016, and 62/415,501, filed on Oct. 31, 2016, the contents of which are all hereby incorporated by reference herein in their entirety.

TECHNICAL FIELD

The present invention relates to a wireless communication system and, more particularly, to a method for transmitting or receiving channel state information and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention proposes a method for transmitting or receiving channel state information.

Furthermore, an object of the present invention proposes a method of transmitting or receiving hybrid channel state information in order to support a multiple antenna multi input multi output (MIMO) system.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a user equipment to transmit Channel State Information (CSI) in a wireless communication system includes the step of performing one integrated CSI process. The step of performing the one integrated CSI process includes the steps of receiving a first CSI-Reference Signal (CSI-RS) associated with a non-precoded CSI-RS resource from a base station; reporting a first Precoding Matrix Indicator (PMI) derived based on the first CSI-RS to the base station; receiving a second CSI-RS associated with one CSI-RS resource of a beamformed CSI-RS type from the base station; and reporting a second Rank Indicator (RI)/Channel Quality Indicator (CQI)/second PMI derived based on the second CSI-RS to the base station. When a periodic CSI reporting is triggered, a reporting period of the first PMI may be configured to be longer than a reporting period of the RI, and may be configured as an integer multiple of the reporting period of the RI.

Furthermore, a derivation of the first PMI based on the first CSI-RS and a derivation of the second RI/CQI/second PMI based on the second CSI-RS by the user equipment may be independently performed.

Furthermore, the step of reporting the first PMI may be the step of additionally reporting a first RI associated with the first PMI along with the first PMI based on the number of layers supported by the user equipment.

Furthermore, the step of reporting the first PMI may be the step of not additionally reporting the first RI along with the first PMI when the user equipment supports up to two layers and additionally reporting the first RI along with the first PMI when the user equipment supports up to eight layers.

Furthermore, the first RI reported along with the first PMI may indicate a rank 1 or a rank 3.

Furthermore, the first PMI may be transmitted in a Physical Uplink Control Channel (PUCCH) format 2 or 3.

Furthermore, when an aperiodic CSI reporting is triggered, the reporting of at least some of the PMI based on the first CSI-RS and the second RI/CQI/second PMI based on the second CSI-RS may be selectively triggered.

In another aspect of the present invention, a user equipment transmitting Channel State Information (CSI) in a wireless communication system includes a Radio Frequency (RF) unit configured to transmit/receive a radio signal and a processor configured to control the RF unit. The processor is further configured to perform one integrated CSI process by receiving a first CSI-Reference Signal (CSI-RS) associated with a non-precoded CSI-RS resource from a base station, reporting a first Precoding Matrix Indicator (PMI) derived based on the first CSI-RS to the base station, receiving a second CSI-RS associated with one CSI-RS resource of a beamformed CSI-RS type from the base station, and reporting a second Rank Indicator (RI)/Channel Quality Indicator (CQI)/second PMI derived based on the second CSI-RS to the base station. When a periodic CSI reporting is triggered, the reporting period of the first PMI may be configured to be longer than the reporting period of the RI, and may be configured as an integer multiple of the reporting period of the RI.

Furthermore, a derivation of the first PMI based on the first CSI-RS and a derivation of the second RI/CQI/second PMI based on the second CSI-RS by the user equipment may be independently performed.

Furthermore, when reporting the first PMI, the processor may additionally report a first RI associated with the first PMI along with the first PMI based on the number of layers supported by the user equipment.

Furthermore, when reporting the first PMI, the processor may not additionally report the first RI along with the first PMI when the user equipment supports up to two layers, and may additionally report the first RI along with the first PMI when the user equipment supports up to eight layers.

Furthermore, the first RI reported along with the first PMI may indicate a rank 1 or a rank 3.

Furthermore, the first PMI may be transmitted in a Physical Uplink Control Channel (PUCCH) format 2 or 3.

Furthermore, when an aperiodic CSI reporting is triggered, the reporting of at least some of the PMI based on the first CSI-RS and the second RI/CQI/second PMI based on the second CSI-RS may be selectively triggered.

Advantageous Effects

In accordance with an embodiment of the present invention, signaling overhead for reporting channel state information can be reduced by defining hybrid channel state information.

Furthermore, in accordance with an embodiment of the present invention, more channel state information processes may be configured in a UE by defining hybrid channel state information.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates a 2D-AAS having 64 antenna elements in a wireless communication system to which the present invention may be applied.

FIG. 10 diagrams the aforementioned example and illustrates a 3D MIMO system using a two-dimension antenna array (i.e., 2D-AAS).

FIG. 11 shows an example of an antenna array model of (M, N, P), which correspond to parameters that characterize an antenna array structure.

FIG. 12 illustrates a transceiver unit model in a wireless communication system to which the present invention may be applied.

FIG. 13 is a diagram illustrating P-CSI feedback modes according to an embodiment of the present invention.

FIG. 14 is a diagram illustrating a CSI process according to the P-CSI mode 2-1 of a legacy system.

FIG. 15 is a flowchart regarding a method for a UE to transmit CSI according to an embodiment of the present invention.

FIG. 16 illustrates a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1(a) exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, \ldots, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol $a\_k,l^\hat{}(p)$ used as a reference symbol on each antenna port p as in Equation 12.

$$a_{k,l}^{(p)} = w_{l''} \cdot r_{l,n_s}(m')$$

[Equation 12]

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

-continued $$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 9 illustrates a 2D-AAS having 64 antenna elements in a wireless communication system to which the present invention may be applied.

FIG. 9 illustrates a common 2D antenna array. A case where $N\_t = N\_v \cdot N\_h$ antennas has a square form as in FIG. 9 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 12(*a*) and a TXRU virtualization model option-2: full connection model as in FIG. 12(*b*) depending on a correlation between an antenna element and a TXRU.

Referring to FIG. 12(*a*), in the case of the sub-array partition model, an antenna element is partitioned into multiple antenna element groups, and each TXRU is connected to one of the groups.

Referring to FIG. 12(*b*), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Channel State Information (CSI) Feedback

An MIMO method may be divided into an open-loop method and a closed-loop method. The open-loop MIMO method means that a transmitting stage performs MIMO transmission without the feedback of channel state information from an MIMO receiving stage. The closed-loop MIMO method means that a transmitting stage receives channel state information fed back by an MIMO receiving stage and performs MIMO transmission. In the closed-loop MIMO method, in order to obtain the multiplexing gain of MIMO transmission antennas, each of the transmitting stage and the receiving stage may perform beamforming based on channel state information. The transmitting stage (e.g., base station) may assign an uplink control channel or uplink shared channel to the receiving stage (e.g., UE) so that the receiving stage (e.g., UE) can feed back channel state information.

The fed-back channel state information (CSI) may include a rank indicator (RI), a precoding matrix index (PMI), a precoding type indicator (PTI) and/or a channel quality indicator (CQI).

The RI is information about a channel rank. The rank of a channel means a maximum number of layers (or streams) that may transmit different information through the same time-frequency resource. A rank value is basically determined by the long term fading of a channel, and thus may be fed back in a longer period (i.e., less frequently) compared to a PMI and a CQI. In the case of transmit diversity, the RI is equal to 1.

The PMI is information about a precoding matrix used for transmission from a transmitting stage, and is a value into which the spatial characteristics of a channel are incorporated. Precoding means that a transmission layer is mapped to a transmit antenna, and a layer-antenna mapping relation may be determined by a precoding matrix. The PMI corresponds to the precoding matrix index of a base station preferred by a UE based on metrics, such as a Signal-to-Interference plus Noise Ratio (SINR). In order to reduce feedback overhead of precoding information, a method for a transmitting stage and a receiving stage to previously share a codebook including several precoding matrices and to feed back only an index indicative of a specific precoding matrix in a corresponding codebook may be used.

The CQI information indicative of channel quality or channel intensity. The CQI may be expressed as a predetermined MCS combination. That is, a fed-back CQI index indicates a corresponding modulation scheme and code rate. In general, the CQI is a value into which a received SINR that may be obtained when a base station configures a PMI is incorporated.

Table 6 illustrates the interpretation of CQI indices for CQI reporting based on Quadrature phase shift keying (QPSK), 16 Quadrature Amplitude Modulation (QAM), 64QAM and 256QAM.

TABLE 6

| CQI index | Modulation | Code rate × 1024 |
|---|---|---|
| 0 | Out of range | |
| 1 | QPSK | 78 |
| 2 | QPSK | 193 |
| 3 | QPSK | 449 |
| 4 | 16QAM | 378 |
| 5 | 16QAM | 490 |
| 6 | 16QAM | 616 |
| 7 | 64QAM | 466 |
| 8 | 64QAM | 567 |
| 9 | 64QAM | 666 |
| 10 | 64QAM | 772 |
| 11 | 64QAM | 873 |
| 12 | 256QAM | 711 |
| 13 | 256QAM | 797 |
| 14 | 256QAM | 885 |
| 15 | 256QAM | 948 |

In a system (e.g., LTE-A system) supporting an extended antenna configuration, to obtain additional multi-user diversity using a multi-user MIMO (MU-MIMO) method is taken into consideration. In the MU-MIMO method, an interference channel is present between UEs multiplexed in an antenna domain. Accordingly, if a base station performs downlink transmission using channel state information fed back by one UE of multiple users, it is necessary to prevent the occurrence of interference with respect to other UEs. Accordingly, in order for the MU-MIMO operation to be correctly performed, channel state information of higher accuracy than that of a single-user MIMO (SU-MIMO) method must be fed back.

A new CSI feedback method improved from CSI including the existing RI, PMI and CQI may be applied so that more accurate CSI can be measured and reported as described above. For example, precoding information fed back by a receiving stage may be indicated by a combination of two PMIs. One (first PMI) of the two PMIs has long-term and/or wideband attributes and may be called W1. The other (second PMI) of the two PMIs has short-term and/or subband attributes and may be called W2. The final PMI may be determined by a combination (or function) of W1 and W2. For example, if the final PMI is W, W=W1*W2 or W=W2*W1 may be defined.

In this case, W1 incorporates an average characteristic on the frequency and/or time of a channel. In other words, W1 may be defined as channel state information into which the characteristics of a long term channel on the time are incorporated, the characteristics of a wideband channel on the frequency are incorporated or the characteristics of a long term on the time and a wideband channel on the frequency are incorporated. In order to simply express such characteristics of W1, W1 is called channel state information (or long term-wideband PMI) of long term-wideband attributes.

Meanwhile, W2 incorporates relatively instantaneous channel characteristics compared to W1. In other words, W2 may be defined as channel state information into which the characteristics of a short term channel on the time are incorporated, the characteristics of a subband channel on the frequency are incorporated or the characteristics of a short term on the time and a subband channel on the frequency are incorporated. In order to simply express such characteristics of W2, W2 is called channel state information (or short term subband PMI) of short term subband attributes.

In order for one final precoding matrix W to be determined based on information (e.g., W1 and W2) of two different attributes indicative of a channel state, it is necessary to configure separate codebooks (i.e., a first codebook for W1 and a second codebook for W2) including precoding matrices indicative of channel information of respective attributes. A form of a codebook configured as described above may be called a hierarchical codebook. Furthermore, to determine the final codebook to be used using the hierarchical codebook may be called hierarchical codebook transformation.

If such a codebook is used, channel feedback of high accuracy is made possible compared to a single codebook. As described above, single-cell MU-MIMO and/or multi-cell cooperation communication may be supported using channel feedback of high accuracy.

Such a CSI reporting method is divided into periodic reporting that is periodically transmitted and aperiodic reporting that is transmitted by a request from a base station.

In the case of the aperiodic reporting, a CSI request field of 1 or 2 bits included in an uplink scheduling grant (e.g., DCI format 0 or 4) downloaded from a base station to each UE is configured in the UE. Each UE may transmit CSI to the base station through a PUSCH by taking its transmission mode into consideration when it receives the information.

In the case of the periodic reporting, a CSI reporting period and an offset in the corresponding period are signaled to each UE through higher layer signaling (e.g., RRC signaling) in a subframe unit. Each UE may transmit CSI in which a transmission mode is taken into consideration to a base station through a PUCCH according to a predetermined period.

If one or more serving cells have been configured in a UE, the UE transmits CSI to only an activated serving cell. If a UE has not been configured to not transmit a PUSCH and a PUCCH at the same time, the UE transmits periodic CSI reporting on the PUCCH. In aperiodic CQI/PMI reporting, RI reporting is transmitted only when a CSI feedback type is configured to support RI reporting. If periodic reporting and aperiodic reporting collide against each other within the same subframe, a UE may transmit only the aperiodic reporting.

First, aperiodic CSI reporting using a PUSCH is described.

Table 7 illustrates CQIs and PMI feedback types for PUSCH CSI reporting modes.

TABLE 7

| | | PMI feedback type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

In each transmission mode, the following reporting modes are supported on a PUSCH.

Transmission mode 1: mode 2-0, 3-0
Transmission mode 2: mode 2-0, 3-0
Transmission mode 3: mode 2-0, 3-0
Transmission mode 4: mode 1-2, 2-2, 3-1, 3-2
Transmission mode 5: mode 3-1
Transmission mode 6: mode 1-2, 2-2, 3-1, 3-2
Transmission mode 7: mode 2-0, 3-0
Transmission mode 8: if a UE is configured to report a PMI/RI, mode 1-2, 2-2, 3-1; if a UE is configured to not report a PMI/RI, mode 2-0, 3-0
Transmission mode 9: if a UE is configured to report a PMI/RI and the number of CSI-RS ports exceeds 1, mode 1-2, 2-2, 3-1, 3-2; if a UE is configured to not report a PMI/RI and the number of CSI-RS ports is 1, mode 2-0, 3-0
Transmission mode 10: if a UE is configured to report a PMI/RI and the number of CSI-RS ports exceeds 1, mode 1-2, 2-2, 3-1, 3-2; if a UE is configured to not report a PMI/RI and the number of CSI-RS ports is 1, mode 2-0, 3-0

An aperiodic CSI reporting mode is configured by higher layer signaling (e.g., RRC signaling).

An RI is reported only in Transmission modes 3 and 4 and Transmission modes 8, 9 and 10 in which PMI/RI reporting has been configured.

1) Wideband Feedback

Mode 1-2

Only transmission in a corresponding subband is assumed in each subband, and a preferred precoding matrix is selected from a codebook subset.

A UE reports one wideband CQI value for each codeword. In this case, a wideband CQI value is calculated assuming that transmission in a subband set S and a precoding matrix selected in each corresponding subband are used.

A UE may report a PMI selected in each subband set S, or the UE may report W1 (i.e., first PMI) for the subband set S and W2 (i.e., second PMI) for each subband set S.

The reported PMI and CQI value are calculated using a reported RI or the rank 1 as a condition.

2) Higher Layer-Configured Subband Feedback

Mode 3-0

A UE reports a wideband CQI value calculated on the assumption of transmission in a subband set S.

A UE also reports a single subband CQI value for each subband set S. The subband CQI value is calculated on the assumption of only transmission in a corresponding subband.

Although an RI exceeds 1, both the wideband and subband CQIs indicate channel quality for a first codeword.

The reported CQI value is calculated using a reported RI or the rank 1 as a condition.

Mode 3-1

A single precoding matrix is selected from a codebook subset on the assumption of transmission in a subband set S.

A UE reports a single subband CQI value in each subband set S for each codeword. In this case, the subband CQI value is calculated on the assumption that transmission in a corresponding subband and a single precoding matrix in all of subbands are used.

A UE reports a wideband CQI value for each codeword. In this case, the wideband CQI value is calculated on the assumption that are transmission in a corresponding subband and a single precoding matrix in all of subbands are used.

The UE may report a selected single PMI or report W1 and W2 corresponding to the selected PMI.

The reported PMI and CQI value are calculated using a reported RI or the rank 1 as a condition.

Mode 3-2

Only transmission in a corresponding subband is assumed with respect to each subband and a preferred precoding matrix is selected from a codebook subset.

A UE reports a single wideband CQI value for each codeword. In this case, the wideband CQI value is calculated on the assumption that transmission in a subband set S and a precoding matrix selected from each subband are used.

A UE may report a selected single PMI with respect to each subband set S or may report W1 for all of subband sets S and W2 for each subband set S.

A UE reports a single subband CQI value for each codeword in each subband set S. In this case, the use of transmission in a single subband and a precoding matrix selected in the corresponding subband is incorporated into the subband CQI value.

The reported PMI and CQI value are calculated using a reported RI or the rank 1 as a condition.

A subband CQI value for each codeword is differentially encoded compared to each wideband CQI using 2 bits.

That is, a subband differential CQI offset level is calculated based on a difference between a subband CQI index and a wideband CQI index (Subband differential CQI offset level=subband CQI index−wideband CQI index).

Table 8 illustrates mapping relations between subband differential CQI values and offset levels.

TABLE 8

| Subband differential CQI value | Offset level |
|---|---|
| 0 | 0 |
| 1 | 1 |
| 2 | ≥2 |
| 3 | ≤−1 |

Table 9 illustrates relations between subband sizes k and system bandwidths in wideband feedback and higher layer-configured subband feedback.

TABLE 9

| System bandwidth $N_{RB}^{DL}$ | Subband size (k) |
|---|---|
| 6-7 | NA |
| 8-10 | 4 |
| 11-26 | 4 |
| 27-63 | 6 |
| 64-110 | 8 |

3) UE-Selected Subband Feedback

Mode 2-0

A UE selects a set consisting of M subbands of a size k preferred within a subband set S. In this case, the k and M values are given in Table 8 according to a system bandwidth.

The UE also reports a single CQI value into which transmission in the M selected subbands has been incorporated. Although the RI exceeds 1, the CQI indicates channel quality for the first codeword.

Furthermore, the UE reports a single wideband CQI value. The wideband CQI value is calculates on the assumption of transmission in the subband set S. Although the RI exceeds 1, the wideband CQI indicates channel quality for the first codeword.

The reported CQI value is calculated using the reported RI or the rank 1 as a condition.

Mode 2-2

A UE selects a set consisting of M subbands of a size k preferred within a subband set S, and selects a single precoding matrix preferred to be used for transmission in M subbands selected from a codebook subset. In this case, the k and M values are given in Table 8 according to a system bandwidth.

The UE reports a single CQI value for each codeword. The CQI value incorporates the use of transmission only in the M selected preferred subbands and the single precoding matrix selected in each of the M subbands.

The UE may also report a selected single PMI preferred in the M selected subbands. The UE may report a selected single PMI for all of the subband sets S or report W1 for all of the subband sets S, and may report W2 for all of the subband sets S and W2 for the M selected subbands.

The single precoding matrix is selected from a codebook subset on the assumption of transmission in the subband set S.

The UE reports a wideband CQI value for each codeword. The wideband CQI is calculated on the assumption that transmission in the subband set S and a single precoding matrix in all of subbands are used.

The reported PMI and the CQI value are calculated using the reported RI or the rank 1 as a condition.

In all the UE-selected subband feedback modes, the UE reports the position of the M selected subbands using a combinatorial index r defined in Equation 15.

$$r = \sum_{i=0}^{M-1} \binom{N-s_i}{M-i} \quad \text{[Equation 14]}$$

In Equation 14, the subband set $\{s_i\}_{i=0}^{M-1}$ includes M subband indices. The subband index is $1 \le s-i \le N$, $s\_i \le s\_i+1$.

In Equation 14, $$\binom{x}{y} = \begin{cases} \binom{x}{y} & x \ge y \\ 0 & x < y \end{cases}$$

is an extended binomial coefficient. Accordingly $$r \in \left\{0, \ldots, \binom{N}{M} - 1\right\}$$

is derived as a unique value.

A CQI value for the M selected subbands for each codeword is differentially encoded compared to each wideband CQI using 2 bits.

That is, a differential CQI offset level is calculated based on a difference between the M selected subbands CQI index and the wideband CQI index (Differential CQI offset level=M selected subband CQI index−wideband CQI index).

Table 10 illustrates mapping relations between differential CQI values and offset levels.

TABLE 10

| Differential CQI value | Offset level |
|---|---|
| 0 | ≤1 |
| 1 | 2 |
| 2 | 3 |
| 3 | ≥4 |

Table 11 illustrates relations between subband sizes k, the number M of subbands within the subband set S, and system bandwidths in UE-selected subband feedback.

TABLE 11

| System bandwidth $N_{RB}^{DL}$ | Subband size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

Next, periodic CSI reporting using a PUCCH is described.

A UE is configured to feed back a semi-statically and periodically different CSI component (CQI, PMI, PTI and/or RI) on a PUCCH using a reporting mode determined in Table 12 by a higher layer. Multiple periodic CSI reporting on a PUCCH corresponding to one or more CSI processes for each serving cell may be configured in a UE in Transmission mode 10 by a higher layer.

Table 12 illustrates CQIs and PMI feedback types for PUCCH CSI reporting modes.

TABLE 12

| PUCCH CQI feedback type | | PMI feedback type | |
|---|---|---|---|
| | | No PMI | Single PMI |
| | Wideband (wideband CQI) | Mode 1-0 | Mode 1-1 |
| | UE-selected (subband CQI) | Mode 2-0 | Mode 2-1 |

In each transmission mode, the following reporting modes are supported on a PUCCH.

Transmission mode 1: mode 1-0, 2-0
Transmission mode 2: mode 1-0, 2-0
Transmission mode 3: mode 1-0, 2-0
Transmission mode 4: mode 1-1, 2-1
Transmission mode 5: mode 1-1, 2-1
Transmission mode 6: mode 1-1, 2-1
Transmission mode 7: mode 1-0, 2-0
Transmission mode 8: if a UE is configured to transmit a PMI/RI, mode 1-1, 2-1; if a UE is configured to not transmit a PMI/RI, mode 1-0, 2-0
Transmission mode 9: if a UE is configured to report a PMI/RI and the number of CSI-RS ports exceeds 1, mode 1-1, 2-1; if a UE is configured to not report a PMI/RI and the number of CSI-RS ports is 1, mode 1-0, 2-0
Transmission mode 10: if a UE is configured to report a PMI/RI and the number of CSI-RS ports exceeds 1, mode 1-1, 2-1; if a UE is configured to not report a PMI/RI and the number of CSI-RS ports is 1, mode 1-0, 2-0

In the case of a UE in which the transmission modes 1-9 has been configured, one periodic CSI reporting mode is configured by higher layer signaling (e.g., RRC signaling) in each serving cell. In the case of a UE in which the transmission mode 10 has been configured, one or more periodic CSI reporting modes are configured by higher layer signaling (e.g., RRC signaling) in each serving cell.

In a UE-selected subband CQI, in a specific subframe of a specific serving cell, CQI reporting indicates channel quality for some of the bandwidth of a serving cell defined as a bandwidth part (BP). An index is assigned to the BP in order of increasing frequency starting from the lowest frequency without an increase of the bandwidth size.

A system bandwidth may be divided into N subband with respect to each serving cell. One subband may include k RBs defined in Table 10. If the RB number of the entire bandwidth is not an integer multiple of k, the last N-th subband may not consist of k RBs. A BP(j) is frequency-contiguous and includes an Nj subband. BPs(J) may be determined over a subband set S or system bandwidth. Each BP(j)(0≤j≤J−1) is contiguously scanned according to an increasing frequency. In UE-selected subband feedback, a single subband is selected from Nj subbands of a BP.

Table 13 shows relations between subband sizes k, BPs (J), and downlink system bandwidths in periodic CSI reporting.

TABLE 13

| System bandwidth $N_{RB}^{DL}$ | Subband size k (RBs) | Bandwidth parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

The following CQI/PMIs and RI reporting types have respective different periods and offsets and support PUCCH CSI reporting modes.

Type 1 reporting supports CQI feedback for a UE-selected subband.
Type 1a reporting supports a subband CQI and W2 feedback.
Type 2, Type 2b, and Type 2c reporting support a wideband CQI and PMI feedback.
Type 2a reporting supports wideband PMI feedback.
Type 3 reporting supports RI feedback.
Type 4 reporting supports a wideband CQI.
Type 5 reporting supports RI and wideband PMI feedback.
Type 6 reporting supports RI and PTI feedback.

A type in which only a wideband CQI/PMI is reported and a type in which both a wideband CQI/PMI and a subband CQI are reported are defined.

First, if only wideband CQI/PMI reporting has been configured, a transmitted subframe is determined like Equation 15.

$$(10 \times n_f + \lfloor n_s/2 \rfloor - N_{OFFSET,CQI}) \bmod (N_{pd}) = 0 \quad \text{[Equation 15]}$$

In Equation 15, n_f indicates a system frame number, and n_s indicates a slot number within a radio frame.

In a UE in which the transmission mode 1-9 has been configured and each serving cell or in each CSI process in a UE in which the transmission mode 10 has been configured and each serving cell, a period N_pd (subframe unit) for CQI/PMI reporting and an offset N_OFFSET, and a CQI (subframe unit) are determined by a higher layer parameter.

If RI reporting is configured, the reporting period of the RI reporting is an integer multiple of M_RI of N_pd, and a subframe in which the RI reporting is transmitted is determined like Equation 16.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 16]}$$

In Equation 16, a relative offset N_OFFSET, an RI and a period M_RI for the RI reporting is determined by a higher layer parameter.

If a wideband CQI/PMI and subband CQI reporting (or subband CQI/W2 reporting for the transmission modes 9 and 10) has been configured, a transmitted subframe is determined like Equation 18.

$$(10 \times n_f + \lfloor n_s/2 \rfloor - N_{OFFSET,CQI}) \bmod N_{pd} = 0 \quad \text{[Equation 17]}$$

When a PTI is not transmitted or the most recently transmitted PTI is 1, the period of wideband CQI/wideband PMI reporting (or wideband CQI/wideband W2 reporting for the transmission modes 8, 9 and 10) is the same as H*N_pd, and a transmitted subframe is determined like Equation 18.

$$(10 \times n_f + \lfloor n_s/2 \rfloor - N_{OFFSET,CQI}) \bmod (H \cdot N_{pd}) = 0 \quad \text{[Equation 18]}$$

In this case, H satisfies H=J*K+1, and J indicates the number of BPs.

A J*K reporting instance present between two contiguous wideband CQIs/wideband PMI (or wideband CQI/wideband W2 for the transmission modes 8, 9 and 10) reportings may be used for subband CQI (or subband CQI/W2 for the transmission modes 9 and 10) reporting. The period of a BP increases up to a BP J−1 starting from a BP 0. The parameter K is set by higher layer signaling (e.g., RRC signaling).

In contrast, when the most recently transmitted PTI is 0, the reporting period of the wideband W1 is the same as H'*N_pd, and a transmitted subframe is determined like Equation 19.

$$(10 \times n_f + \lfloor n_s/2 \rfloor - N_{OFFSET,CQI}) \bmod (H' \cdot N_{pd}) = 0 \quad \text{[Equation 19]}$$

In this case, H' is signaled by a higher layer.

A reporting instance left between the two contiguous wideband W1 reportings is used for a wideband W2 along with a wideband CQI.

If RI reporting is configured, the reporting period of the RI reporting is the same as a multiple of M_RI of a wideband CQI/PMI period H*N_pd. The RI is reported through the same PUCCH cyclic shift resource as a wideband CQI/PMI and subband CQI report, and a subframe for the RI reporting is determined like Equation 20.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 20]}$$

1) Wideband Feedback

Mode 1-0

In a subframe in which an RI is reported (in the case of Transmission mode 3), a UE determines an RI on the assumption of transmission in a subband set S, and reports Type 3 reporting including one RI.

In a subframe in which a CQI is reported, a UE determines Type 4 reporting including one wideband CQI value calculated on the assumption of transmission in a subband set S. Although an RI exceeds 1, the wideband CQI indicates channel quality for the first codeword. The CQI is calculated using the most recently reported periodic RI or the rank 1 as a condition.

Mode 1-1

In a subframe in which an RI is reported, a UE may determine an RI on the assumption of the transmission of the subband set S. In this case, the UE reports Type 3 reporting including one RI.

In a subframe in which an RI and W1 are reported, a UE may determine an RI on the assumption of the transmission of a subband set S. In this case, the UE reports Type 5 reporting including a joint-coded RI and W1 (a set of precoding matrices selected in a codebook subset on the assumption of the transmission of the subband set S).

In a subframe in which a CQI/PMI is reported, a single precoding matrix is selected from a codebook subset on the assumption of the transmission of the subband set S. A UE reports Type 2 reporting including a single wideband CQI and a selected single PMI (wideband PMI). In this case, the single wideband CQI value is calculated on the assumption of transmission in the subband set S and the use of a single precoding matrix in all of subbands. When an RI exceeds 1, as in the example of Table 11, a wideband spatial differential CQI of additional 3 bits may be included in Type 2 reporting.

In a subframe in which a wideband CQI/W2 is reported, a single precoding matrix is selected from a codebook subset on the assumption of transmission in a subband set S. A UE reports Type 2b reporting including a single wideband CQI value and wideband W2. The single wideband CQI value is calculated on the assumption of transmission in the subband set S and the use of a single precoding matrix in all of subbands. When an RI exceeds 1, as in the example of Table 11, a wideband spatial differential CQI of additional 3 bits may be included in Type 2b reporting.

In a subframe in which a wideband CQI/W1/W2 is reported, a single precoding matrix is selected from a codebook subset on the assumption of transmission in a subband set S. A UE reports Type 2c reporting including a single wideband CQI value, wideband W1 and wideband W2. The single wideband CQI value is calculated on the assumption of transmission in the subband set S and the use of a single precoding matrix in all of subbands. When an RI exceeds 1, as in the example of Table 11, a wideband spatial differential CQI of additional 3 bits may be included in Type 2c reporting.

2) UE-Selected Subband Feedback

Mode 2-0

In a subframe in which an RI is reported, a UE determines an RI on the assumption of the transmission of the subband set S. The UE reports Type 3 reporting including one RI.

In a subframe in which a wideband CQI is reported, a UE may report Type 4 reporting, including a single wideband CQI value calculated on the assumption of transmission in a subband set S, in each contiguous reporting opportunity. Although an RI exceeds 1, the wideband CQI indicates channel quality for the first codeword. The CQI may be calculated using the most recently reported periodic RI or the rank 1 as a condition.

In a subframe in which a CQI for a selected subband is reported, a UE selects a preferred subband within a set of Nj subbands within each J BP. The UE reports Type 1 reporting including a single CQI value. Transmission in the subband selected in the above-determined BP, together with the L bit label of a corresponding preferred subband, is incorporated into the single CQI value. Type 1 reporting for each BP may be alternately reported in each contiguous reporting opportunity. Although an RI exceeds 1, channel quality for the first codeword is incorporated into the CQI. Preferred subband selection and the CQI value may be calculated using the most recently reported periodic RI or the rank 1 as a condition.

Mode 2-1

In a subframe in which an RI is reported, a UE may report Type 3 reporting including a single RI. Furthermore, the UE may report Type 6 reporting including a PTI for a CSI process and a single RI.

In a subframe in which a wideband CQI/PMI is reported, a single precoding matrix is selected from a codebook subset on the assumption of transmission in a subband set S. A UE may report Type 2 reporting including a wideband CQI value and a selected single PMI. The wideband CQI value may be calculated on the assumption of the transmission of the subband set S and the use of a single precoding matrix in all of subbands. When an RI exceeds 1, as in the example of Table 11, a wideband spatial differential CQI of additional 3 bits may be included in Type 2 reporting.

In a subframe in which wideband W1 is reported, a set of precoding matrices corresponding to the wideband W1 is selected from a codebook subset on the assumption of transmission in a subband set S. A UE reports Type 2a reporting, including the wideband W1 corresponding to the set of selected precoding matrices, in each contiguous reporting opportunity.

In a subframe in which a wideband CQI/W2 is reported, a single precoding matrix is selected from a codebook subset on the assumption of transmission in a subband set S. A UE reports Type 2b reporting, including the wideband CQI and the wideband W2 corresponding to the selected single precoding matrix, in each contiguous reporting opportunity. When an RI exceeds 1, as in the example of Table 11, a wideband spatial differential CQI of additional 3 bits may be included in Type 2b reporting.

In a subframe in which a CQI for a selected subband is reported, a UE selects a preferred subband within a set of Nj subband within each J BP. The UE reports Type 1 reporting, including a CQI value for each BP, in a contiguous reporting opportunity. Transmission in the selected subband of the above determined BP, together with a corresponding preferred subband L bit label, is incorporated into a CQI value for a codeword 0. When an RI exceeds 1, a subband spatial differential CQI for the offset level of a codeword 1 of additional 3 bits may be included in Type 1 reporting. The offset level of the codeword 1 is determined as a difference value between a subband CQI index for the codeword 0 and a subband CQI index for the codeword 1 (Codeword 1 offset level=subband CQI index for codeword 0–subband CQI index for codeword 1). The subband spatial differential CQI is calculated on the assumption of transmission in a subband selected within an applicable BP and the use of the most recently reported single precoding matrix in all of subbands. A mapping relation between a subband spatial differential CQI of 3 bits and an offset level is shown in Table 11.

In a subframe in which a wideband CQI/W2 is reported, a single precoding matrix is selected from a codebook subset on the assumption of transmission in a subband set S. A UE reports Type 2b report, including the wideband CQI value and the wideband W2, in each contiguous reporting opportunity. The wideband CQI value is calculated on the assumption of transmission in the subband set S and the use of a single precoding matrix selected in all of subbands. When an RI exceeds 1, as in the example of Table 11, a wideband spatial differential CQI of additional 3 bits may be included in Type 2b reporting.

In a subframe in which a subband CQI/W2 for a selected subband is reported, a UE selects a preferred subband within a set of Nj subbands within each J BP. A UE reports Type 1a reporting, including a CQI value and W2 for each BP, in each contiguous reporting opportunity. Transmission in the selected subband of the above determined BP, together with a CQI value for codeword 0, is incorporated into a corresponding preferred subband L bit label. W2 of a precoding matrix is selected as a preferred precoding matrix from a codebook subset on the assumption of transmission only in a subband selected within the above selected applicable BP. When an RI exceeds 1, a subband spatial differential CQI for the offset level of a codeword 1 of additional 3 bits may be included in Type 1a reporting. The offset level of the codeword 1 is determined as a difference value between the subband CQI index for the codeword 0 and the subband CQI index for the codeword 1 (Codeword 1 offset level=subband CQI index for codeword 0–subband CQI index for codeword 1). A subband spatial differential CQI is calculated on the assumption of transmission in a subband selected within an applicable BP and the use of selected W2 and precoding matrix corresponding to the most recently reported W1. A mapping relation between the subband spatial differential CQI of 3 bits and the offset level is shown in Table 11.

Table 14 illustrates mapping relations between spatial differential CQI values and offset levels.

TABLE 14

| Spatial differential CQI value | Offset level |
| --- | --- |
| 0 | 0 |
| 1 | 1 |
| 2 | 2 |
| 3 | ≥3 |
| 4 | ≤−4 |
| 5 | −3 |
| 6 | −2 |
| 7 | −1 |

Hybrid Channel State Information (Hybrid CSI) Transmission/Reception Method

A CSI process for Precoding Matrix Indicator (PMI)-based reporting may be configured as follows. The CSI process may include any one (or both) of 2 CSI reporting class A or class B. In this case, Class A is based on a non-precoded CSI-RS, and Class B corresponds to a CSI process based on a beamformed CSI-RS.

In the case of Class A, a UE may report CSI based on a W=W1W2 codebook based on {[8],12,16} CSI-RS ports.

In the case of Class B, a UE may report L port CSI on the assumption of any one of the following 4 alternatives.

Alt. 1: an indicator for beam selection and an L-port CQI/PMI/RI for the selected beam. In a CSI process, the number of all ports configured for all of CSI-RS resources is greater than L.

Alt. 2: an L-port precoder from a codebook in which beam selection(s) and co-phasing for 2 polarizations have been combined and incorporated. In this case, the number of all of configured ports in the CSI process is L.

Alt. 3: a codebook in which L-port CSI for a selected beam and beam selection have been incorporated. The number of all of configured ports for all of CSI-RS resources in a CSI process is greater than L.

Alt. 4: an L-port CQI/PMI/RI. The number of all of configured ports in a CSI process is L (this is always set when a CSI measurement restriction is supported).

A beam selection (anytime if it is applicable) may be considered to be the selection of a subset of antenna ports within one CSI-RS resource or the selection of CSI-RS resources from a set of resources. Furthermore, reported CSI may be an extension of L-port CSI of Rel. 12.

The CSI process is related to K(K>=1) CSI-RS resources/configurations. In this case, a CSI-RS port number for the k-th CSI-RS resource of all of the K CSI-RS resources/configurations is N_k.

In the case of Class A CSI reporting (i.e., non-precoded CSI-RS-based CSI reporting), a total number of CSI-RS ports within a single CSI process is 16.

In the case of Class A CSI reporting, one of the following alternatives may be used.

Alt. 1: a CSI-RS resource/configuration of N_k=12/16 may be previously defined. That is, it may be configured for a CSI process in which the index of a CSI-RS configuration is K=1.

Alt. 2: in the case of a 12/16 port CSI-RS, K(K>1) CSI-RS resources/configurations of 2/4/8 ports may be aggregated.

In a CSI process of reporting Class B, the following alternatives may be proposed. In this case, the number of antenna ports L for CSI may be set as 2, 4 or 8, for example.

Alt-1 of Class B:
  Beam selection indicator (BI) definition, for example, RSRP or CSI-based, wideband vs subband, short-term vs long-term.
  BI bitwidth (related to K)
  Support UE-specific beamforming when a rank is greater than 2
  A UCI feedback mechanism on a PUCCH/PUSCH
Alt-2 of Class B:
  A codebook for beam selection and co-phasing (it may be derived from a legacy codebook or codebook elements or may be newly designed) along with an associated PMI (it may be newly designed or W=W2 is assumed in the case of a legacy codebook)
  A UCI feedback mechanism on a PUCCH/PUSCH Alt-3 of Class B:
Beam selection and a codebook for CSI, a PMI include information about a selected beam and a precoding matrix for an L-port within the selected beam.
A UCI feedback mechanism on a PUCCH/PUSCH
Alt-4 of Class B:
A measurement restriction mechanism; may be applied to Alt-1 to 3.

The following descriptions may be proposed with respect to the alternative 1 to 4 of CSI that reports Class B.

$N\_k \in \{1,2,4,8\}$

In the case of Alt. 1, a UE may report L port CSI on the assumption of one of the following conditions i) and ii).
i) $L=N\_k$, ii) $L(<=N\_k)$ (In this case, L may be set or fixed)

In the case of Alt. 2, the following two schemes may be applied.
i) A UE reports L-port CSI on the assumption of L=sum (Nk) for all of ks;
ii) a UE reports L-port CSI when K is always 1 ($L=N\_1$)

In the case of Alt. 3, a UE reports L-port CSI on the assumption of one of the following conditions.
i) $L=N\_k$, ii) $L(<=N\_k)$ (In this case, L may be configured or fixed)

In the case of Alt. 4, a UE reports L-port CSI on the assumption of $L=N\_k$.

In Class A CSI reporting and Class B CSI reporting (i.e., beamformed CSI-RS-based CSI reporting) (when CSI-IM is supported and used), one of the following alternatives may be selected with respect to a CSI-IM and CSI resource/configuration associated with a CSI process.

Alt. 1: one CSI process is related to one CSI-IM (common interference measurement resource for all of CSI resources/configurations within one CSI process).

Alt. 2: one CSI process may be associated with multiple CSI-IMs.

RRC signaling supports different CSI resources/configurations associated with different CSI-IM resource configurations.

At least some of a CSI-IM resource configuration may be supported by Rel. 12 legacy. Furthermore, a plurality of CSI-IM resources per CSI process for Class B and a total number of CSI-IMs for Class A and B may be supported.

If a measurement restriction (MR) for channel measurement has been activated (ON) in a CSI process, a channel used for CSI calculation may be estimated from X NZP CSI-RS subframes (including a CSI reference resource).

Channel measurement may be derived from an NZP CSI-RS.

X may be explicitly set depending on a selected scheme or may be selected as one of 1 and Z_x by a UE.

In a CSI process for a CSI-IM(s), if an MR for interference measurement is ON, interference used for CSI calculation may be estimated from a Y CSI-IM subframe(s) (including a CSI reference resource).

Interference measurement may be derived from a CSI-IM.

Y may be explicitly set depending on a selected scheme or may be selected as one of 1 and Z_x by a UE.

If a CSI process is configured without a CSI-IM, if an MR for interference measurement is ON in the CSI process not having a CSI-IM, interference used for CSI calculation may be estimated from a V subframe(s) (including a CSI reference resource).

In a CSI process, an MR may be higher-layer configured with respect to both a channel and interference. In this case, MRs for a channel and interference may be independently configured. That is, in other words, both the MR for a channel and the MR for interference may be independently taken into consideration. Furthermore, in the case of an interference measurement restriction for a CSI process, a CSI process in which a CSI-IM has been configured or a CSI process in which a CSI-IM has not been configured may be independently taken into consideration.

Furthermore, the aforementioned parameter X, Y may be determined based on one of the following alternatives.

Alt. 1: a fixed MR according to a higher layer configuration becomes ON or OFF. In this case, X/Y is fixed as each one value.

Alt. 2: a configurable MR according to a higher layer configuration is activated (ON) or deactivated (OFF). In this case, X={OFF, 1, . . . , NX} may be higher-layer-configured, and Y={OFF, 1, . . . , NY} may be higher-layer-configured.

Alt. 3: CSI measurement is reset periodically. The reset period and subframe offset are higher-layer-configured. In this case, X may be selected as one of 1 and Zx by a UE. In this case, Zx corresponds to the number of CSI-RS subframes between the latest measurement reset and the CSI reference resource. Furthermore, Y may be selected as one of 1 and Zy by the UE. In this case, Zy corresponds to the number of CSI-RS subframes between the latest measurement reset and the CSI reference resource.

With respect to Class A and Class B and all of K values,
If a legacy measurement restriction for two subframe sets has been configured in a CSI process, the MR may be independently configured in each subframe set,
One RRC parameter for channel measurement (for only Class B) and one RRC parameter for interference measurement (for Class A and Class B) are provided to activate/deactivate an MR.

With respect to Class A and Class B and a case where a K value is 1,
Alt. 1(X=Y=1): a fixed MR through a higher layer configuration becomes ON or OFF. In this case, X/Y is fixed as each one value.

In Rel-13, the design principle for 12- and 16-port NZP CSI-RS resources may be as follows:
CSI-RS density of 1 RE/RB/port is maintained.
Only 40 CSI-RS REs per PRB pair are reused for 12- and 16-port NZP CSI-RS resources.
12- or 16-port NZP CSI-RS REs are obtained by combining the NZP CSI-RS REs of a plurality of legacy CSI-RS configurations of the same subframe.

In the case of a 12- or 16-port, a CSI-RS resource for Class A CSI reporting may be configured by combining K CSI-RS configurations.

$\Sigma k\ Nk \in \{12,16\}$

CDM-2 or CDM-4 per CSI-RS resource may be configured in a UE. In this case, in CSI-RS transmission, there is no need to transmit LS in RAN 4 in order to change 6 dB power boosting assumption.

RRC configuration parameters may include the following elements:
1) A configuration list of K CSI-RS resources: In the case of CDM-2, CSI-RS resource configurations may indicate CSI-RS RE locations according to legacy resource configurations of 36.211. In this case, $N\_k \in \{2, 4, 8\}$, and the same $N\_k=N$ may be used for all of k. One or more values may be selected from {2, 4, 8}.

2) One set of dependent parameters to be applied to all of resources in common within a CSI-RS resource of Rel-13 may include the number of antenna ports N, a subframe configuration, a scrambling Id, and QCL information.

The structure of the 12- and 16 port CSI-RS for CDM-2 is as follows.
The structure of 16 ports: (N, K)=(8,2), (2,8)
The structure of 12 ports: (N, K)=(4,3), (2,6)

The mapping of a CSI-RS RE to CDM-2 may be performed as follows.

The ports of aggregated resources may correspond to the ports of configuration resources as follows.

With respect to 16 CSI-RS ports, aggregated port numbers may be 15, 16, . . . 30.

With respect to 12 CSI-RS ports, aggregated port numbers may be 15, 16, . . . 26.

The mapping of a CSI-RS RE to CDM-4 may be performed as follows.

A full-port CSI-RS may be mapped to each OFDM symbol used for CSI-RS mapping. Furthermore, a CDM RE set structure may be determined to be any one of the following alternatives.

Alt. 1: only time domain (4 OFDM symbols)

Alt. 2: time and frequency domains (2 subcarriers×2 OFDM symbols)

Meanwhile, in the DwPTS, the ZP and NZP CSI-RS of 2/4/8/12/16 ports may be supported.

In the case of EB/FD-MIMO of Rel. 13, a CSI reporting mode may be associated with only the frequency granularity of a CQI and PMI. Furthermore, EB/FD-MIMO of Re. 13 may specify the extension of the PUSCH of Rel. 12 based on Aperiodic (A)-CSI reporting modes for FD-MIMO as follows.

The A-CSI modes supported along with the PMI may be the following modes present in Rel. 12: 1-2, 2-2, 3-1 and 3-2

The content of A-CSI reporting may depend on codebook-related parameters and a CSI reporting class. In this case, a reported CQI, RI and PMI may be configured as follows depending on CSI reporting mode definition.

The size of a base CQI and RI may be the same as that in Rel. 12 (a base CQI size per CW is 4 bits).

Furthermore, EB/FD-MIMO of Re. 13 may specify the extension of the PUCCH of Rel. 12 based on a Periodic (P)-CSI reporting modes for FD-MIMO as follows.

The A-CSI modes supported along with the PMI may be the following modes present in Rel. 12: 1-1 and 2-1

P-CSI reporting content may depend on a sub-mode (if any), codebook-related parameters and a CSI reporting class. In this case, a reported CQI, RI and PMI may be configured as follows depending on CSI reporting mode definition.

The size of a base CQI and RI may be the same as that in Rel. 12 (a base CQI size per CW is 4 bits).

CSI reporting modes in Rel. 12 not having a PMI may be supported by default.

In a Class A codebook, valid (O1, O2) combinations for each (N1, N2) may be proposed as in Table 15.

TABLE 15

| (N1, N2) | (O1, O2) combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

Hereinafter, CSI reporting for Class B when K>1 is described in more detail.

A BI in a PUCCH may be configured as follows.

The BI may be reported in the PUCCH 2/2a/2b format.

A CSI type including the BI has higher priority than a CSI type not having a BI (e.g., an RI, RI/W1, W2/CQI, W1/W2/CQI, a PMI/CQI).

CSI types including a BI have the same priority.

Collision handling complies with the rule of Rel. 12 (CSI priority base, CSI-process index and CC-index).

A BI in a PUCHD may be configured as follows.

The BI is always triggered along with CSI.

The following alternatives may be proposed as BI mapping for a PUSCH.

Alt. 1: a BI jointly encoded with an RI

Alt. 2: a BI independently encoded, closer to a DMRS than an RI

Alt. 3: a BI independently encoded, farther to a DMRS than an RI

Alt. 4: jointly encoded along with a CQI/PMI

When K>1, the bitwidth of a BI reported in the case of CSI reporting for Class B may be determined based on a set K value and may be set to a maximum of 3 bits.

Hereinafter, CSI reporting for Class B when K=1 is described in more detail.

CSI (CQI/PMI/RI) may be reported in the PUCCH format 2/2a/2b.

Periodic CSI reporting for Class B when K=1 may be configured as follows.

A periodic CSI reporting mechanisms of Rel. 12 may be reused.

1) 1-port CSI-RS: modes 1-0 and 2-0 comply with the description of Rel. 12.

2) 2-, 4-, 8-port CSI-RS: modes 1-1 and 2-1

If W2-only feedback has been configured: with respect to 2-, 4- and 8-port CSI-RS, when L≤4, one mode 1-1 may be configured without a sub-mode along with the PMI of an L-bit. Mode 2-1 complies with the description of Rel. 8.

If legacy feedback has been configured: mode 1-1 and 2-1 comply with the description of Rel. 12.

In the case of aperiodic CSI reporting for Class Bfmf when K=1, an aperiodic CSI (CQI/PMI/RI) reporting mechanism of Rel. 12 may be reused and may be configured as follows.

Reporting mode description: 1-port CSI-RS is mode 1-0, 2-0 and 3-0/2-, 4- and 8-port CSI-RS is mode 1-2, 2-2, 3-1 and 3-2

UCI mapping for a PUSCH

An aperiodic CSI triggering mechanism of Rel. 12 is reused

Hereinafter, a codebook subset restriction for Class A is described.

A cell specific reference (CSR) RRC parameter for i2 of Class A may be introduced. In this case, all of possible codewords per rank may be expressed as a bitmap.

In the case of W1 CSR, a bitmap (N1*O1*N2*O2) bits may indicate a subset restriction of 2D-beams. Furthermore, a bitmap including 8 additional bits may indicate a rank restriction.

Hereinafter, a codebook subset restriction for Class B is described.

In the case of Class B, that is, K=1

W2-only feedback: a bitmap of all of possible codewords per rank

Legacy feedback: comply with the CSR schemes of Rel. 12.

In the case of Class B when K>1,

Each of K CSI-RS resources may be configured as one of the legacy CSR schemes of Rel. 12.

The scheme is based on a CSI-RS port number and a selected codebook (for 4-port).

Table 16 is a table summarizing parameters related to a CSI procedure and descriptions thereof.

TABLE 16

| Parameter | Description | Value range |
| --- | --- | --- |
| CSI-Reporting-Type | Each CSI process may be configured as class A or B | 1 bit indicative of Class A or class B |
| Codebook-Config-N1 | Antenna port number per polarization in first dim of codebook of Rel. 13 | ENUMERATED {an1, an2, an3, an4, an8} |
| Codebook-Config-N2 | An antenna port number per polarization in second dim of codebook of Rel. 13 | ENUMERATED {an1, an2, an3, an4, an8} |
| PMI-Config | Each UE may receive one of W-only PMI feedback and legacy PMI feedback configured thereto | The enumeration of {1, 2} for indicating the selection of PMI feedback |
| Codebook-Over-Sampling-RateConfig-O1 | A codebook spatial oversampling rate of first dimension of Rel. 13 codebook | {N/A, 4, 8} |
| Codebook-Over-Sampling-RateConfig-O2 | A codebook spatial oversampling rate of second dimension of Rel. 13 codebook | {N/A, 4, 8} |
| Codebook-Subset-SelectionConfig | A subset of a master codebook entry is configured in each UE | The enumeration of {1, 2, 3, 4} indicates codebook configurations |
| R13-Codebook-Subset-Restriction-1 | 2D beams indicate that reporting will not be permitted | With respect to W1 CSR, A bitmap of (N1*O1*N2*O2) bits indicates a 2D beam subset restriction. Furthermore, an additional 8-bit bitmap for a rank restriction |
| R13-Codebook-Subset-Restriction-2 | i2 indicates that reporting will not be permitted | Specified in TS 36.213 |
| NZP-CSI-RS-R13 | A group of NZP-CSI-RS parameters indicates that it will be used for Class A CSI reporting (based on legacy CSI-RS resources) | A maximum number of R13 NZP CSI-RS per CC is 3 |
| NZP-CSI-RS-ID-List | Indicate a set of legacy CSI-RS-ConfigNZPId-r11 associated with this CSI Process | A maximum size of a list is 8 Each ID is integer {1, . . . , 24} |
| CSI-IM-ID-List | Indicate csi-IM-ConfigId-r11 associated with this CSI process. Each CSI-IM-ConfigId is associated with one CSI-RS-ConfigNZPId | The size of a set is the same as NZP-CSI-RS-ID-List having a one-to-one connection between NZP-CSI-RS-ID-List and CSI-IM-List. Each ID is integer {1, . . . , 24} |
| legacyCSRList | A list of legacy codebook subset restriction bitmaps, each CSI-IM-ConfigId is associated with one CSI-RS-ConfigNZPId | The size of a list is the same as NZP-CSI-RS-ID-List having a one-to-one connection between NZP-CSI-RS-ID-List and legacy CSR list |
| Channel-Measurement-Restriction | A measurement restriction for channel measurement indicates whether it is activated or deactivated | 1 bit for indicating whether a measurement restriction for channel measurement is activated or deactivated |
| Interference-Measurement-Restriction | Indicate whether a measurement restriction for interference measurement is activated or deactivated | 1 bit for indicating whether a measurement restriction for interference measurement is activated or deactivated |
| CRI-Config-Index | Indicate a subframe offset of a CSI-RS resource indicator for selecting a period (as an integer multiple of an RI period) and NZP-CSI-RS resource | Integer (0 . . . 1023), |
| CDM-type | Indicate CDM2 or CDM4 type of R13 NZP-CSI-RS | 1 bit for indicating CDM2 or CDM 4 |
| NZP-CSI-RS-Configuration-List | Indicate a set of CSI-RS-configurations for producing R13 NZP-CSI-RS | The size of a list may be a [2, 3, 6, 8] value from each configuration = [1 . . . 32]. A value range is different if a bitmap is used to indicate a list. |
| Number-of-antenna-ports-per-CSI-RS-Configuration | An antenna port number for all NZP-CSI-RS configurations of Configuration-List | ENUMERATED {an2, an4, an8} |
| Subframe-config | A subframe configuration for all NZP-CSI-RS configurations of Configuration-List | Integer (0 . . . 154), |
| Scrambling ID | A scrambling ID for all NZP-CSI-RS configurations of Configuration-List | Integer (0 . . . 503), |
| QCL info | QCL information for all NZP-CSI-RS configurations of Configuration-List | Same as legacy |
| Number-of-additional-Uppts | Indicate an additional UpPTS symbol number | ENUMERATED {2 symbol, 4 symbol} |
| PcList | Indicate the power offset of an NZP CSI-RS RE for a PDSCH RE. Each Pc in a list is associated with NZP CSI RS configured in NZP CSI-RS-ID-List | Same as previous one |

TABLE 16-continued

| Parameter | Description | Value range |
| --- | --- | --- |
| Rel-13-DMRS-table | Indicate that a UE should use a new DMRS table in DCI. | 1 bit indicating that a new or legacy table of Rel-13 should be used |
| SoundingRS-UL-ConfigDedicated-extendedUpPTs | An SRS configuration parameter for an extended UpPTS in a trigger type 0 | The same parameter set and value ranges are used as in SoundingRS-UL-ConfigDedicated. In this case, the modification of value ranges of a new parameter (Number-of-combs) and parameters (transmissionComb, cyclicShift) is excluded. |
| SoundingRS-UL-ConfigDedicatedAperiodic-extendedUpPTS | An SRS configuration parameter for an extended UpPTS for a trigger type 1 | The same parameter set and value ranges are used as in SoundingRS-UL-ConfigDedicatedAperiodic-r10. In this case, the modification of value ranges of a new parameter (Number-of-combs) and parameters (transmissionCombAp, cyclicShiftAp) is excluded. |
| Number-of-combs | Indicate the number of Combs | ENUMERATED {2 combs, 4 combs} |
| transmissionComb | Indicate a parameter $k\_TC \in \{0, 1, 2, 3\}$ for periodic sounding reference signal transmission | Integer (0 . . . 3) |
| transmissionCombAp | Indicate a parameter $k\_TC \in \{0, 1, 2, 3\}$ for aperiodic sounding reference signal transmission | Integer (0 . . . 3) |
| cyclicShift | Indicate a parameter: $n\_SRS$ for each periodic sounding reference signal transmission. TS 36.211 [21, 5.5.3.1], In this case, cs0 corresponds to 0, etc. | ENUMERATED {cs0, cs1, cs2, cs3, cs4, . . .} |
| cyclicShiftAp | Indicate parameter: $n\_SRS$ for each aperiodic sounding reference signal transmission | ENUMERATED {cs0, cs1, cs2, cs3, cs4, . . .} |

Hereinafter, P-CSI feedback modes are first described before a hybrid CSI transmission/reception method proposed by this specification is described.

FIG. 13 is a diagram illustrating P-CSI feedback modes according to an embodiment of the present invention.

More specifically, FIG. 13(a) is a diagram illustrating a sub-mode 1 in the CSI reporting mode 1-1, FIG. 13(b) is a diagram illustrating a CSI reporting mode 2-1 in the CSI reporting mode 1-1, and FIG. 13(c) is a diagram illustrating a sub-mode 2 in the CSI reporting mode 1-1. Hereinafter, the CSI reporting mode may be called a "P-CSI mode."

Referring to FIG. 13(a), one CSI full reporting may include three reporting instances in the PUCCH format 2/2a/2b as follows.

The first (reporting) instance: an RI
The second (reporting) instance: W1((i11 or i'11) & i12))
The 3rd (reporting) instance: a CQI and W2(i2)

In Rel. 13, it may be assumed that codebook sub-sampling is not necessary for the sub-mode 1 of the class A codebook P-CSI mode 1-1 along with a configuration given by RRC.

Each (reporting) instance may be determined based on the following equations. For example, the first (reporting) instance at which an RI is reported/transmitted may be determined to be an instance at which the aforementioned equation 16 is satisfied. Furthermore, the second (reporting) instance at which W1 (or PMI 1) is reported/transmitted may be determined to be an instance at which the aforementioned equation 19 is satisfied. Furthermore, the third (reporting) instance at which a CQI and W2 (or PMI 2) is reported/transmitted may be determined to be an instance at which the aforementioned equation 17 is satisfied.

The P-CSI mode 2-1 may be the same as the legacy 8-Tx P-CSI mode 2-1 other than the following differences.

In the class A codebook of Rel. 13 having a configuration (Config.) given by RRC, legacy sub-sampling may be reused for i2 (codebook index) for Configurations 2, 3 and 4 and sub-sampling is not used for i2 for Configuration 1.

If PTI=0, the second (reporting) instance may correspond to W1 ((i11 or i'11) & i12)).

In the case of P-CSI reporting for Class A, FD-MIMO of Rel. 13 may be designed to support the sub-mode 1 of the PUCCH mode 1-1 and the PUCCH mode 2-1.

The P-CSI modes have been described above. Hereinafter, a hybrid CSI transmission/reception method according to an embodiment of the present invention is described in more detail.

An (Rel-13) CSI process may be configured as Class A (up to 16 ports) (based on a non-precoded CSI-RS) or may be configured as (beamformed CSI-RS-based) Class B. There may be a difference in the CSI process operation depending on that the CSI process is configured as which class (i.e., Class A or Class B).

In a more advanced Full Dimension (FD)-MIMO system, a massive MIMO environment supporting the port number of 64 ports or more may be taken into consideration. To this end, a method extended from the method regarding Class A (the number of CSI-RS ports is set to 16 or more and a codebook-based form thereof) and/or a method extended from the method regarding Class B may be taken into consideration.

For example, CSI reporting in which Class A has been configured may be extended to be available for the port number of 64 ports or more. This may be set as one "CSI process 1" so that a UE can perform corresponding CSI feedback (in a relatively low period). Accordingly, the UE can obtain suitable channel direction information (CDI) and report it to a base station. Furthermore, at the same time, for example, CSI reporting in which measurement restriction (MR)-ON and Class B have been configured may be set as a "CSI process 2." The base station transmits the CDI obtained and reported by the UE through the "CSI process 1" by applying it to a beam coefficient (or may also be called a beamforming coefficient/beamforming coefficient/beam coefficient/beamformed coefficient) corresponding to the "CSI process 2" upon CSI-RS transmission. Accordingly, the base station may receive CSI feedback for the beamformed CSI-RS transmission from the UE. An effective CSI feedback operation into which CSI-RS overhead in a massive MIMO environment is taken into consideration in such as form may be derived/applied.

An operation of a combination/association form between CSI feedback into which a "large number of ports (e.g., 16 ports or more in a low duty period)", such as a Class A+Class B form (or Class B+Class B form), and CSI feedback into which a "small number of ports (e.g., less than 16 ports in a high duty period)" are taken into consideration may be called "hybrid CSI-RS based schemes." Hereinafter, if such hybrid CSI-RS based schemes are applied, there is proposed an efficient CSI feedback method of a UE.

In particular, a method supporting the hybrid CSI-RS based schemes within one CSI process is hereinafter proposed. For example, a hybrid operation/form in which CSI reporting of a class A type (i.e., Class A CSI reporting) and CSI reporting of a class B type (i.e., Class B CSI reporting) are combined within one CSI process may be proposed. In this case, an A-port codebook (in this case, A may be set as a natural number of 16 or more) may be applied to Class A, and an N_k-port codebook may be applied to Class B. If A is 16 and N_1 is set to 4 (K=1, MR-ON and PMI-config=1), both a 16-port CSI-RS resource for Class A and a 4-port CSI-RS resource for Class B may be included in one CSI process.

The configuration of a new CSI process of such a form may be classified, defined/configured as a new class, such as "Class C". In this case, "Class C" is only an example assigned as the name of a new class. If it is newly defined as a separate CSI process, a new identification/configuration method may be applied to a corresponding process.

The hybrid CSI-RS based schemes of the Class A+Class B form may be defined as a "mechanism 1" and may have the following technical characteristics.

(1) Reporting content

In the case of the first eMIMO-type (i.e., Class A), i1 and x-bit RI may be reported, and a CQI and i2 is not reported.

if a UE supports up to 2 layers, x=0 if a UE supports up to 8 layers, x=1 (in this case, RI={1, 3})

In the case of the second eMIMO-type (i.e., Class B, K=1), a CQI, a PMI and an RI are reported.

(2) No inter-dependence between CSI calculations across two eMIMO-Types.

(3) A legacy CSI reporting mechanism having the following improved characteristics is reused.

(4) In the case of a P-CSI-based PUCCH i1 and an RI are reported in one subframe. In this case, the PUCCH format 2 or 3 may be used.

The CSI period of the first eMIMO-type may be set as an integer multiple of the RI period of the second eMIMO-type.

The subframe offset of the first eMIMO-type may be defined in proportion to the RI subframe offset of the second eMIMO-type.

(5) In the case of a PUSCH based on A-CSI

If aperiodic CSI reporting is triggered, the following two options are present regarding that which CSI will be reported from a UE.

Option 1: a UE reports CSI of both the first and second eMIMO-types.

Option 2: a UE reports one of the 2 eMIMO-types.

Hereinafter, two different CSI-RS resource configurations (NZP CSI-RS resource #0 and NZP CSI-RS resource #1) used in a CSI process to which Class C in a new next-generation system (e.g., Rel. 14) has been applied is described.

Meanwhile, in this specification, a base station is used as a comprehensive term including a remote radio head (RRH), a transmission point (TP), a reception point (RP), an eNB and a relay. Hereinafter, for convenience of description, embodiments are chiefly described based on the 3GPP LTE system, but are not limited thereto and may be extended to other systems in addition to the 3GPP LTE system.

1. An NZP CSI-RS resource #0 (may be called an n-th CSI-RS resource/configuration (e.g., n=2) or second eMIMO-type)

The NZP CSI-RS resource #0 may correspond to a resource for the CSI reporting of the class B type. In this case, the NZP CSI-RS resource #0 may be fixed/set/allocated as a resource (e.g., a CSI-RS resource having the lowest/smallest index) that belongs to CSI-RS resources and that is located at a specific location.

At least one of the following configurations may be defined as a default configuration for the NZP CSI-RS resource #0 (e.g., a CSI-RS resource having the lowest/smallest index). The description of Table 16 may be applied to a description regarding the following parameters, and a redundant description thereof is omitted.

A configuration as a CSI-RS resource for the CSI reporting of the class B type

K is set to 1

PMI-config is set to 1 (i.e., W2-only the codebook applied) or the PMI-config may be set to 2 (i.e., a legacy codebook applied).

In this case, when the PMI-config is set to 2, clear operation definition regarding the reporting instance of W1 is necessary (e.g., an operation of reporting W1 along with an RI, W2 and/or a CQI at the same reporting instance may be defined).

an MR is set as activation (ON) or deactivation (OFF)

The MR is ON. More specifically, only a channel measurement restriction may be set as ON or only an interference measurement restriction may be set as ON. Alternatively, both the channel measurement restriction and the interference measurement restriction may be set as ON, but a measurement restriction into which measurement dynamics are most well incorporated may be set as ON.

A specific N_1 value is set. For example, like N_1=2 or 4, the N_1 value may be set/defined as a preset port number. Alternatively, the N_1 value may be set as a parameter that must be mandatorily signaled.

Furthermore, at least one of the following parameters may be defined as a parameter configurable with respect to the NZP CSI-RS resource #0 (e.g., a CSI-RS resource having the lowest/smallest index).

When K>1, in the CSI-RS resource #0, K CSI-RS resources may be recognized as a composite CSI-RS resource of a aggregated form, and may comply with some of (or the entire) operation defined/configured for Class B when K>1 in a conventional system.

N_k (k=1, K) (if K>1) for each k. If not, one N_1 value is set.

PMI-config (if K=1)

Subframe sets may be configured or may not be configured (the configuration of a subframe set may be for supporting an eICIC and/or eIMTA operation)

Whether a channel measurement restriction will be activated/deactivated (ON/OFF) (this may be independently configured with respect to periodic or aperiodic CSI reporting) (if configured, it is configured in a subframe set unit)

Whether an interference measurement restriction will be activated/deactivated (ON/OFF) (this may be independently configured with respect to periodic or aperiodic CSI reporting) (if this parameter has been configured, it is configured in a subframe set unit)

Pc (if this parameter has been configured, it is configured in a subframe set unit)

A codebook subset restriction-related parameter/configuration information (e.g., R13-CSR-1, 2, 3 and/or legacy CSR may be individually configured. In this case, in the present embodiment, the NZP CSI-RS resource #0 is allocated/used for the CSI reporting of the class B type when K=1, and thus R13-CSR-3 may be configured)

2. NZP CSI-RS resource #1 (may be called an n-th CSI-RS resource/configuration (e.g., n=1) or first eMIMO-type)

The NZP CSI-RS resource #1 may be divided as two options as follow according to embodiments.

(1) Option 1

In one embodiment, the NZP CSI-RS resource #1 may correspond to a resource for the CSI reporting of the class A type. In this case, the NZP CSI-RS resource #1 may be fixed/set/allocated as a resource that belongs to CSI-RS resources and that is located at a specific location (e.g., a CSI-RS resource having the second lowest/smallest index or the highest index).

At least one of the following configurations may be defined as a default configuration with respect to the NZP CSI-RS resource #1 (e.g., a CSI-RS resource having the second-lowest/smallest index or the highest index). The description of Table 16 may be applied to a description regarding the following parameters, and a redundant description thereof is omitted.

A configuration as a CSI-RS resource for the CSI reporting of the class B type

A port number A is set as a specific value (e.g., A=12 or 16) or the port number A may be set as a parameter that must be mandatorily signaled.

A restriction that the rank 1 is always applied may be defined/configured (i.e., RI=1) (in this case, a UE feeds back only one piece of the best channel direction information (CDI), which is applied as the beam coefficient of the CSI-RS resource #0). In this case, if the rank 1 restriction is set, it may construed that an RI is not separately fed back when the UE feeds back W1 (or i1, PMI 1) (because the RI is always set to "1"). In this case, the UE in which the rank 1 restriction has been set may be a UE supporting up to 2-layers. The corresponding UE does not separately feed an RI back when it feeds W1 back according to the first eMIMO-type.

Furthermore, at least one of the following parameters may be defined as a parameter configurable with respect to the NZP CSI-RS resource #1 (e.g., a CSI-RS resource having the second-lowest/smallest index or the highest index).

A port number A (e.g., A may be set as 8, 10, 12, 14, 16, 18, 20, 24, 32, 40, or 64 and may be set as other values)

Subframe sets may be configured or may not be configured (the configuration of the subframe set may be for supporting an eICIC and/or eIMTA operation)

Pc (if this parameter has been configured, it is configured in a subframe set unit)

Codebook subset restriction-related parameter/configuration information (e.g., R13-CSR-1, 2, 3, and/or legacy CSR may be individually configured. In this case, in the present embodiment, the NZP CSI-RS resource #1 is allocated/used for the CSI reporting of the class A type, and thus R13-CSR-1 and/or 2 may be configured)

Parameters related to a class A codebook generation, such as N1, N2, O1, O2, and Config Parameters related to the configuration of a CSI-RS for the class A type, such as CDM-type, NZP-CSI-RS-configuration-list, subframeConfig, QCL-info, and scramblingID (2) Option 2

In another embodiment, the NZP CSI-RS resource #1 may correspond to a resource for the CSI reporting of the class B type. In this case, the NZP CSI-RS resource #1 may be fixed/set/allocated as resource that belongs to CSI-RS resources and that is located at a specific location (e.g., a CSI-RS resource having the second-lowest/smallest index or the highest index).

At least one of the following configurations may be defined as a default configuration with respect to the NZP CSI-RS resource #1 (e.g., a CSI-RS resource having the second-lowest/smallest index or the highest index). The description of Table 16 may be applied to a description regarding the following parameters, and a redundant description thereof is omitted.

A configuration as a CSI-RS resource for the CSI reporting of the class B type

K is set as a value greater than 1 (e.g., K=4) or K greater than 1 may be configured as a parameter that must be mandatorily signaled.

an MR is set as activation (ON) or deactivation (OFF)

The MR is ON. More specifically, only a channel measurement restriction may be set as ON or only an interference measurement restriction may be set as ON. Alternatively, both the channel measurement restriction and the interference measurement restriction are set as ON, but a measurement restriction into which measurement dynamics are most well incorporated may be set as ON.

A specific N_k value is set. For example, with respect to all of k (k=1, . . . K), like N_k=2 or 4, N_k may be set/defined as a preset port number. Alternatively, the N_k value may be set as a parameter that must be mandatorily signaled.

Furthermore, at least one of the following parameters may be defined as a parameter configurable with respect to the NZP CSI-RS resource #1 (e.g., a CSI-RS resource having the second-lowest/smallest index or the highest index).

K (K>1, accordingly, in the CSI-RS resource #1, K CSI-RS resources may be recognized as a composite CSI-RS resource of an aggregated form and may comply with some of (or the entire) operation defined/configured for Class B when K>1 in a conventional system.

N_k for each k (k=1, K) (if K>1)

Subframe sets may be configured or may not be configured (the configuration of the subframe set may be for supporting an eICIC and/or eIMTA operation)

Whether a channel measurement restriction will be activated/deactivated (ON/OFF) (this may be independently configured with respect to periodic or aperiodic CSI reporting) (if configured, it is configured in a subframe set unit)

whether an interference measurement restriction will be activated/deactivated (ON/OFF) (this may be independently configured with respect to periodic or aperiodic CSI reporting) (if this parameter has been configured, it is configured in a subframe set unit)

Pc (if this parameter has been configured, it is configured in a subframe set unit)

Codebook subset restriction-related parameter/configuration information (e.g., R13-CSR-1, 2, 3, and/or legacy CSR may be individually configured. In this case, in the present embodiment, the NZP CSI-RS resource #1 is allocated/used for the CSI reporting of the class B type when K>1, and thus a legacy CSR may be configured)

If Options 1 and 2 coexist with respect to the NZP CSI-RS resource #1, an RRC switching parameter (e.g., R14-Class-type-indicator) for identifying whether the NZP CSI-RS resource #1 is a CSI-RS resource to which Option 1 has been applied or a CSI-RS resource to which Option 2 has been applied may be newly defined. A base station may indicate detailed information on the NZP CSI-RS resource #1 to a UE by explicitly signaling this using the corresponding parameter.

As described above, a CSI reporting form of the class C type may be newly defined/configured within one CSI process. In this case, only one CSI-IM resource may be defined to be present within a corresponding CSI process. In this case, there is an effect in that one CSI-IM resource corresponding to the (composite) NZP CSI-RS resources #0 and #1 in common is configured. Alternatively, an individual CSI-IM resource corresponding to the (composite) NZP CSI-RS resource #0 or #1 may be configured. Alternatively, more specifically, CSI-IM resources corresponding to each specific CSI-RS resource unit within a specific (composite) NZP CSI-RS resource may be configured as a pair.

Meanwhile, in the CSI process of the class C type, a CSI-IM resource may be configured in common or may be independently configured depending on the NZP CSI-RS resource #0 or #1 (or first eMIMO-type or second eMIMO-type).

More specifically, in one embodiment, an RRC parameter ("channelMeasRestriction") indicative of the activation/deactivation (ON/OFF) of a channel measurement restriction (MR) in each "CSI-RS-ConfigBeamformed" for specifying each CSI-RS configuration may be independently configured in the NZP CSI-RS resource #1 (i.e., the first eMIMO-type) and the NZP CSI-RS resource #0 (i.e., the second eMIMO-type). This is for reporting relatively long-term and/or wideband PMI (i.e., channel direction) information in the NZP CSI-RS resource #1. The NZP CSI-RS resource #0 is for reporting relatively short-term and/or narrowband CSI. Accordingly, the target and object of measurement/report are different between the NZP CSI-RS resource #1 and the NZP CSI-RS resource #0. Accordingly, there is an advantage in that a flexible operation suitable for various environments is made possible by independently configuring the channel MR ON/OFF function.

For example, the NZP CSI-RS resource #1 is a long term and may be determined to deteriorate performance if measurement averaging is performed by a UE or may be set as MR-ON for a beamformed CSI-RS resource sharing purpose. In contrast, the NZP CSI-RS resource #0 may be set as MR-OFF like a legacy operation. Furthermore, although the NZP CSI-RS resource #1 is relatively a long-term, a noise suppression gain through measurement averaging can be obtained by configuring MR-OFF with respect to the NZP CSI-RS resource #1. A beamformed CSI-RS resource sharing effect can be obtained in a short-term level by configuring MR-ON in the NZP CSI-RS resource #0.

Alternatively, in another embodiment, an RRC parameter ("channelMeasRestriction") indicative of the activation/deactivation (ON/OFF) of a channel measurement restriction (MR) may be configured in common within a specific CSI process in which the NZP CSI-RS resource #1 (i.e., first eMIMO-type) and the NZP CSI-RS resource #0 (i.e., second eMIMO-type) are together configured. Accordingly, when channel measurement is performed on the NZP CSI-RS resource #1 and NZP CSI-RS resource #0 having associated purposes, a restriction may be applied so that CSI derivation can be performed by applying the common MR ON/OFF. Accordingly, there is an advantage in that a UE operation and complexity in a CSI calculation process within the one integrated CSI process can be simplified.

That is, if the MR ON is configured, when all of channel measurements are performed on a corresponding CSI process, an operation of measuring only a measurement sample for a single subframe may be always applied. If the MR OFF is configured, an UE implementation can be supported more simply so that a single operation process, such as specific moving averaging and weighted averaging, is consistently applied.

For example, the MR-ON or the MR-OFF is selectively configured generally within a CSI process for hybrid depending on whether an implementation of a corresponding base station transmitting beamformed CSI-RS resources operates beamformed CSI-RS resource sharing along with other UEs within a corresponding cell. Accordingly, there are advantages in that the complexity of unnecessary signaling can be reduced and the easiness of an implementation can be supported.

Likewise, the codebook subset restriction-related parameter/configuration information may also be configured in common or may be independently configured depending on the NZP CSI-RS resource #0 or #1 (or first eMIMO-type or second eMIMO-type) in the CSI process of the class C type.

Hereinafter, a CSI feedback operation of a UE in which the CSI process of the class C type has been configured is described in detail. Hereinafter, for convenience of description, a case where a parameter for each NZP CSI-RS resource has been configured as follows is assumed and described. In this case, an embodiment of the present invention is not limited thereto:

1. NZP CSI-RS resource #0 (or may be called a first CSI-RS configuration or a second eMIMO-type)
   Configured as a CSI-RS resource for the CSI reporting of the class B type
   K=1
   N_1=4
   PMI-config=1 (W2-only feedback)
   A subframe set is not configured
   MR ON (both channel measurement restriction and interference measurement restriction are activated)
   A specific Pc value
2. NZP CSI-RS resource #1 (or may be called a second CSI-RS configuration or a first eMIMO-type)
   Configured as a CSI-RS resource for the CSI reporting of the class A type (i.e., the aforementioned Option 1 is applied, and a parameter indicative of Option 1 may be signaled)
   A port number A=16
   A subframe set is not configured
   A specific Pc value Parameters related to class A codebook generation, such as specific N1, N2, O1, O2, Config Parameters related to the configuration of a CSI-RS for the class A type, such as a specific CDM-type, NZP-CSI-RS-configuration-list, subframeConfig, QCL-info, and scramblingID A codebook subset restriction (CSR) to which a rank 1 restriction has been applied In this case, a specific P-CSI feedback mode (e.g., extended P-CSI mode 1-1 & submode 1, or extended P-CSI mode 2-1) may be configured within CSI process configuration information of the class C type. A detailed CSI process in each mode is described. The description given in relation to FIG. 13 may be applied to the following embodiments related to each mode identically/similarly.

1. Extended P-CSI Mode 1-1 & Submode 1

One CSI full reporting may include three reporting instances in at least the PUCCH format 2/2a/2b as follows. In this case, regarding the three reporting instances in at least the PUCCH format 2/2a/2b, the PUCCH format 2/2a/2b may construed as being applied/configured in at least some of the three reporting instances, and the PUCCH format 3 may construed as being applied/configured in the remaining reporting instances. For example, the PUCCH format 3 may be applied to the first instance, and the PUCCH format 2/2a/2b may be applied to the remaining second and third instances.

The first (reporting) instance: W1 ((i11 or i'11) & i12)) (in this case, restricted to the rank 1)

The second (reporting) instance: an RI

The third (reporting) instance: CQI+W2(i2)

W1 reported at the first (reporting) instance may be derived by measuring th NZP CSI-RS resource #1 in order to obtain the most preferred CDI.

The RI reported at the second (reporting) instance may be derived by measuring the NZP CSI-RS resource #0.

CQI and W2 reported at the third (reporting) instance may be derived by measuring the NZP CSI-RS resource #0.

In the case of the extended P-CSI mode 1-1 & submode 1 (or for Rel.13) for 12- or 16-port, a class A codebook of Rel. 13 having a Config parameter given by RRC may be assumed to not require codebook sub-sampling.

The first embodiment of detailed equations for deriving the aforementioned first, second and third instances may comply with Equation 21 to 23. More specifically, Equation 21 is an equation for deriving the first instance at which W1 is transmitted/reported, Equation 22 is an equation for deriving the second instance at which an RI is transmitted/reported, and Equation 23 is an equation for deriving the third instance at which CQI and W2 are transmitted/reported.

$$(10 \times n_f + \lfloor n_s/2 \rfloor - N_{OFFSET,CQI} - N_{OFFSET,CQI}) \bmod (H'' \cdot N_{pd}) = 0 \quad \text{[Equation 21]}$$

In Equation 21, N_OFFSET,CDI correspond to a W1 reporting offset and has not been separately defined conventionally. However, the W1 reporting offset may be newly defined separately according to an embodiment as in this equation and may be determined by a higher layer parameter.

$$(10 \times n_f + \lfloor n_s/2 \rfloor - N_{OFFSET,CQI} - N_{OFFSET,RI}) \bmod (M_{RI} \cdot N_{pd}) = 0 \quad \text{[Equation 22]}$$

In Equation 22, RRC parameters of a legacy system may be reused as M_RI, N_OFFSET,RI, N_OFFSET, CQI and N_pd.

$$(10 \times n_f + \lfloor n_s/2 \rfloor - N_{OFFSET,CQI}) \bmod (N_{pd}) = 0 \quad \text{[Equation 23]}$$

Referring to Equation 21 and 22, the W1 feedback/reporting period may be determined as H''*N_pd, and the RI feedback/reporting period may be determined as M_RI*N_pd. In this case, H'' correspond to a parameter newly defined independently of the existing H' parameter, and may be set as a value greater than M_RI. More specifically, H'' may be defined as an integer multiple (integer multiple) of M_RI. As a result, mod(H'', M_RI)=0 may be satisfied. As a result, the feedback period of W1 (or the CSI reporting period of the first eMIMO-Type) reported at the first (reporting) instance may construed as being an integer multiple of the feedback period of an RI (or the RI reporting period of the second eMIMO-Type) reported at the second (reporting) instance, that is, the feedback period of the RI. In other words, the W1 feedback period (e.g., the W1 feedback period of the first eMIMO-Type) may be definition/configuration/determined to be an integer multiple of the feedback period of the RI of another eMIMO-type (i.e., the RI feedback period of the second eMIMO-Type) other than the RI of the same eMIMO-type (i.e., the RI feedback period of the first eMIMO-Type). As described above, if the W1 feedback/reporting period is determined to be H'' *N_pd, it may correspond to a case where a UE supports up to 2 layers. If a UE supports up to 8 layers, a definition/configuration may be performed so that both W1 and an RI (in this case, x=1 bit RI={1, 3}) for the first eMIMO-type are reported in the period of the H''*N_pd.

Alternatively, in a second embodiment, Equation 21 of the first embodiment may be substituted with Equation 24 and thus the first to third instances may be derived.

$$(10 \times n_f + \lfloor n_s/2 \rfloor - N_{OFFSET,CQI}) \bmod (H'' \cdot N_{pd}) = 0 \quad \text{[Equation 24]}$$

The first embodiment (in particular, Equation 21) may be applied to a case where the offset (N_OFFSET,CDI) for W1 has been defined/configured, and the second embodiment (in particular, Equation 24) may be applied to a case where the offset for W1 has not been defined/configured.

The reason why the CSI reporting/feedback period of the class A type is set as an integer multiple of the RI reporting/feedback period of the class B type as described above is for applying CDI, obtained through the CSI reporting/feedback period of the class A type, to the CSI process of the class B type by setting the term of the CSI reporting/feedback period of the class A type period to be longer than that of the RI reporting/feedback period of the class B type as described above.

2. Extended P-CSI mode 2-1

P-CSI mode 2-1 for at least 12- or 16 ports (or the class A codebook of Rel. 13) is the same as the legacy 8-Tx P-CSI mode 2-1 other than the following exceptions.

(1) The class A codebook of Rel. 13 having a Config parameter given by RRC may be assumed as follows.

Legacy sub-sampling is reused for i2 for Config 2, 3, 4. For i2 for Config 1, sub-sampling is not used.

If a new codebook other than the Rel.13 class A codebook is applied, whether (legacy) sub-sampling is applied may be determined depending on an i2 bitwidth according to codebook details, such as a corresponding beam selection pattern. For example, if i2>2 bits, legacy sub-sampling may be applied.

(2) An RI is derived by measuring the NZP CSI-RS resource #0.

(3) A CQI and W2(i2) are derived by measuring the NZP CSI-RS resource #0.

(4) If a PTI is 0 (i.e., in the case of wideband reporting), in order to obtain the most preferred CDI, W1 ((i11 or i'11) & i12)) (in this case, restricted to the rank 1) is derived by measuring the NZP CSI-RS resource #1, and this is fed back/reported at the second instance.

Such a CSI process of the Extended P-CSI mode 2-1 may be defined by reusing the CSI process of the legacy P-CSI mode 2-1.

FIG. 14 is a diagram illustrating a CSI process according to the P-CSI mode 2-1 of a legacy system.

If the CSI process of the Extended P-CSI mode 2-1 is defined by reusing the CSI process of the legacy P-CSI mode 2-1, referring to FIG. 14, a CSI process of transmitting an RI at the first (reporting) instance (derived by measuring the NZP CSI-RS resource #0), transmitting W1 ((i11 or i'11) and i12)) (PTI is 0) are transmitted at the second (reporting) instance (if they are derived by measuring the NZP CSI-RS resource #1 and restricted to the rank 1), and transmitting a CQI and W2(i2) at the third (reporting) instance (derived by measuring the NZP CSI-RS resource #0) may be derived.

This is different from the information transmitted at the first, second and third reporting instances proposed in the Extended P-CSI mode 1-1 & submode 1. More specifically, in the Extended P-CSI mode 1-1 & submode 1, W1 is first reported/transmitted at the first (reporting) instance (in a low duty period), and an RI is reported/transmitted at the second reporting instance (in a high duty period). However, the P-CSI mode 2-1 is chiefly for the purpose of supporting subband reporting when the PTI is 1. Accordingly, such a definition/configuration has not problem unlike in the Extended P-CSI mode 1-1 & submode 1.

Accordingly, the characteristic in which the "period of W1 period (derived from the NZP CSI-RS resource #1) is an integer multiple of the period of an RI (derived from the NZP CSI-RS resource #0)", which is established in the Extended P-CSI mode 1-1 & submode 1 may not be established in the Extended P-CSI mode 2-1. Instead, in accordance with the Extended P-CSI mode 2-1 proposed by this specification, when the PTI is 0, a characteristic in which the "period of W1 (derived from the NZP CSI-RS resource #1) may be identical with or smaller than the period of an RI (derived from the NZP CSI-RS resource #0)" may be established.

Furthermore/alternatively, in a mode supporting sub-band reporting like the Extended P-CSI mode 2-1, when the PTI is 0, the CSI type of wideband and/or long-term attributes may be reported by a UE. When a PTI is 1, the CSI type of subband and/or short-term attributes may be reported by a UE.

Hereinafter, for convenience of description, the RI and W1 of the first eMIMO-type are referred to as RI(1) and W1(1), respectively. The RI, W1, W2 and CQI of the second eMIMO-type are referred to as RI(2), W1(2), W2(2) and CQI(2), respectively.

If the CSI type is reported when a PTI is 0 (i.e., wideband and/or long-term attributes), a definition/configuration may be performed so that an RI (corresponding to the RI of the first eMIMO-type) jointly encoded with the corresponding PTI is reduced to 0 or 1 bit and optimized for the CSI reporting operation of the first eMIMO-Type. Alternatively, if the CSI type is reported when a PTI is 1 (subband and/or short-term attributes), a definition/configuration may be performed so that RI(2) jointly encoded with the corresponding PTI is optimized for the CSI reporting operation of the second eMIMO-Type based on a bitwidth (e.g., 3 bits depending on UE capability on supported layers) as in a legacy system.

In this case, referring to the legacy P-CSI mode 2-1 of FIG. 14, W1 reporting subsequent to the reporting of a PTI (PTI=0) of a 0 value may be limited/defined/configured as the W1(1) report of the first eMIMO-type. Furthermore, W2 and CQI reporting may be limited/defined/configured as the W2(2) and the CQI(2) reporting of the second eMIMO-type calculated based on the latest reported RI(2).

More specifically, if W1 reporting subsequent to the reporting of a PTI (PTI=0) of a 0 value is performed several times, W1 reporting from the N-th (e.g., N=2) of the W1 reportings may be defined/configured as the W1 (i.e., W1(2)) reporting of the second eMIMO-type not the first eMIMO-type. In this case, the N value may be fixed to a specific value or may be separately signaled/set.

Alternatively, in W1 reporting subsequent to the reporting of a PTI (PTI=0) of a 0 value, the W1(1) reporting of the first eMIMO-type and the W1(2) reporting of the second eMIMO-type may be (alternately/repeatedly) performed at a specific pattern. The alternating/repeating pattern of the W1(1) and W1(2) reporting may be separately configured.

Alternatively, reporting instances after all of the PTI (PTI=0) of a 0 value and the PTI (PTI=1) of a 1 value are reported may be limited/defined/configured for the second eMIMO-type. The reporting (e.g., the RI(1) and W1(1) of the first eMIMO-type) of the first eMIMO-type may be reported using an independent (and/or additional) period and/or offset parameter separately from the second eMIMO-type.

For example, a definition/configuration may be performed so that the RI(1) and W1(1) of the first eMIMO-type are jointly encoded, but are always reported at an instance spaced apart from an instance at which PTI=0 is reported by a specific offset parameter (e.g., at a preceding point (in this case, a base station may comply with an implementation in which the base station processes a received signal in such a way as to always receive a signal at a corresponding point earlier than a PTI reporting point, to store the signal, to interpret the previously stored signal by decoding the previously stored signal only when the value of a subsequently received PTI point is 0, and to neglect the signal if not) or the RI(1) and W1(1) are reported at an instance spaced apart from a point corresponding to a specific integer multiple of the a PTI reporting period regardless of a PTI value by a specific offset parameter every point. In this case, the specific offset parameter may be separately configured. If a collision with another PUCCH reporting instance according to a corresponding instance is generated, a UE may be configured to operate according to a previously defined/configured collision handling rule. For example, CSI content for the first eMIMO-Type, such as RI(1) and W1(1), may be configured to be always reported easily than CSI content for the second eMIMO-Type, but the remainder is dropped.

In the operation of the aforementioned embodiment, a specific restriction regarding a minimum period in which a UE reports PTI=0 may be applied.

For example, a restriction may be applied in which if a maximum of X (e.g., X=5) times of PTI=1 are contiguously reported, PTI=0 must be reported at a next PTI reporting instance. Accordingly, PTI=0 can be restricted to be reported once within at least a specific section. In this case, there is an effect in that there is no problem in applying the beamforming of the second eMIMO-Type because reporting for the first eMIMO-Type can be intermittently transmitted.

Furthermore/alternatively, if reporting for the second eMIMO-Type is configured as Class B (K=1, PMI-Config=1 (e.g., W2-only codebook)) (i.e., Option), W1 reporting is not performed. In this case, PTI=1 may be restricted to be always reported by a UE. Alternatively, since a UE always reports only PTI=1, a definition/configuration may be performed so that only an RI is reported in such a manner that a PTI bitwidth has been removed.

As described above, in the operation for a UE to derive W1(1) (derived from the NZP CSI-RS resource #1) and RI(2)/W2(2)/CQI(2) (derived from the NZP CSI-RS resource #0) from different CSI-RS resources within the CSI processes of respective class C types, the NZP CSI-RS resources #0 and #1 may have different periods and offsets. In other words, W1 and RI/W2/CQI may be derived from the different NZP CSI-RS resources, and a reported period and offset may be differently set for each NZP CSI-RS resource. In this case, for a CSI-RS overhead reduction effect of the hybrid CSI-RS based schemes, it is preferred that the period of the NZP CSI-RS resource #1 is set to be much longer than that of the NZP CSI-RS resource #0.

The period/offset setting of each CSI-RS resource depends on a base station operation. Accordingly, when a UE derives W1(1) (derived from the NZP CSI-RS resource #1) and RI(2)/W2(2)/CQI(2) (derived from the NZP CSI-RS resource #0), it may derive respective parameter values by incorporating measurement samples/results (and/or in association with reference resource timing) measured using the latest valid subframe based on the transmission timing of each NZP CSI-RS resource #X (X=0 or 1).

For example, RI(2) jointly encoded with PTI=0 reported by a UE in the P-CSI mode 2-1 will be derived from the NZP CSI-RS resource #0, and subsequent W1(1) will be derived from the NZP CSI-RS resource #1. In this case, the reported RI(2) cannot become an RI into which preferred CDI derived by subsequently reported W1(1) has been incorporated. As a result, new RI reporting into which preferred CDI according to the latest reported W1 has been incorporated may be incorporated into the measurement and CSI derivation of a UE at a reporting instance capable of next PTI signaling and validly reported.

In order to effectively improve such a problem, the feedback chain in the P-CSI mode 2-1 may be improved.

For example, a UE may be configured to always first report wideband W1(1) (derived from the NZP CSI-RS resource #1), and a base station may incorporate the W1(1) reported by the UE into the CSI-RS resource #0 as a beam coefficient and transmit it to the UE. In this case, an improved P-CSI feedback chain of a method in which the UE measures the CSI-RS resource #0 into which the beam coefficient has been incorporated to have a new beamformed direction and sequentially reports RI(2)/W2(2)/CQI(2) (derived from the NZP CSI-RS resource #0), that is, the results of the measurement of a corresponding resource, to the base station may be newly proposed.

In order for such an operation to be performed, a minimum time interval of Y ms may be present between the wideband W1(1) (derived from the NZP CSI-RS resource #1) (reporting) instance and the subsequent RI(2) (derived from the NZP CSI-RS resource #0) (reporting) instance. In this case, the Y value may be determined by taking into consideration all of the time (propagation delay may be taken into consideration) taken for a base station to receive W1 (or W1(1)) transmitted by a UE and to obtain CDI, the time taken for the base station to transmit the obtain CDI by incorporating it into the CSI-RS resource #0 and/or the time taken for the UE to measure the transmitted CSI-RS resource #0, to derive CSI, and to report RI(2) (derived from the NZP CSI-RS resource #0).

For example, if the Y value will be defined to be the smallest value, assuming that the time taken for a base station to obtain CDI and to transmit a CSI-RS resource #0 into which the CDI has been incorporated is 1 ms and a UE receives the CSI-RS resource #0 and reports an RI derived using the CSI-RS resource #0 after 4 ms, the Y value may be defined/set to "5."

In this case, this is only an example. In a lower-latency system design, a value of Y<5 may also be taken into consideration. If Y>5, it is preferred that flexibility is provided in which the Y value may be set as a minimum value of values that may be used as the Y value. That is, Y may enable a difference between W1(1) (derived from the NZP CSI-RS resource #1) (reporting) instance and RI(2) (derived from the NZP CSI-RS resource #0) (reporting) instance to be flexibly set so that for example, a value, such as 5, 10, 15, . . . , can be incorporated as the Y value depending on a network operation/implementation.

In the above embodiments, for convenience of description, a case where the 16-port codebook of Rel-13 has been configured in the NZP CSI-RS resource #1 has been described as an example, but is not limited thereto. An A-port codebook (in this case, A>16) may also be applied to the NZP CSI-RS resource #1. A new CSI type may be defined depending on the application of such a new codebook. In this case, the present invention may be extended and applied to a form in which the new CSI type is included/changed in W1 or replacing W1 or a case where the new CSI type is added to the aforementioned embodiment/operation and transmitted at a separate reporting instance.

Hereinafter, a hybrid CSI-RS classified as joint utilization between beamformed CSI-RSs of different types in addition to joint utilization between a non-precoded (NP) CSI-RS (i.e., a CSI-RS based on the class A type) and a beamformed (BF) CSI-RS (i.e., a CSI-RS based on the class B type) is described.

1. Joint Utilization Between NP and BF CSI-RS

On type of hybrid CSI-RS based on a scheme may correspond to joint utilization between an NP CSI-RS (Class A) and a BF CSI-RS (Class B). This may be applied/used by configuring the CSI processes of two Rel. 13. In particular, an NP CSI-RS resource (e.g., CSI-RS resource #1) having a relatively high period may be configured in the first CSI process of the class A type. Furthermore, a BF CSI-RS resource (or CSI-RS resource #0) having a relatively low period may be configured in the second CSI process of the class B type. The CSI feedback of a UE may be independently performed per CSI process, but a base station may apply/use a PMI reported from the first CSI process to/in the BF CSI-RS of the second CSI process as a beam coefficient.

In the case of eFD-MIMO of Rel. 14, for higher efficient CSI reporting, how a hybrid operation of deriving one united/integrated CSI process using such two CSI processes will be optimized needs to be additionally discussed. In this case, as contents to be considered, an actually necessary CSI feedback element from the first CSI process is PMI information, and a CQI is not the actually necessary CSI feedback element. The reason for this is that a CQI reported through the second CSI process actually correspond to a related CQI in the short-term level of CSI for link adaptation.

In one design possible for the Hybrid CSI-RS in the united/integrated CSI process, a Hybrid CSI-RS resource may include at least two CSI-RS resources (e.g., an NP CSI-RS 1 (e.g., CSI-RS resource #1) and BF CSI-RS 2 (e.g., CSI-RS resource #0) whose measurement restriction has been activated. In this case, W1 reporting may be performed based on the NP CSI-RS 1, and the RI/W2/CQI report may be performed based on the BF CSI-RS 2.

In this case, W2 may be defined/configured to be combined with reported W1 and to be derived and reported.

Alternatively, W2 may be defined/configured so that it is independently derived and reported regardless of reported W1. In the case of the latter, W1 reported to a base station is recognized as being applied as the beam coefficient of the BF CSI-RS 2, and a UE may derive and report CSI by independently measuring the BF CSI-RS 2. In this case, in the CSI, an independent PMI may be calculated/derived/reported as RI/PMI/CQI rather than RI/W2/CQI. In this case, the PMI may be subdivided into W1 reporting and W2 reporting.

Aperiodic CSI reporting in the united/integrated CSI process may be performed based on the results of the recent measurement of a CSI-RS 1 and a CSI-RS 2. This may mean that although W1 derived from the most recently transmitted NP CSI-RS 1 has not yet been incorporated into the BF CSI-RS 2, the corresponding W1 will be used to determine a beamforming coefficient to be applied to a next BF CSI-RS 2 in the operation of a base station.

Aperiodic CSI triggering of triggering such an aperiodic CSI reporting may be extended/applied in a general form to trigger only at least some of {W1, RI, W2, CQI}. For example, (if a UE supports up to 2 layers) triggering may be performed so that at least one of W1(1) and RI(2)/W2(2)/CQI(2) (or RI(2)/PMI(2)/CQI(2)) is selectively reported. Alternatively, (if a UE supports up to 8 layers) triggering may be performed so that at least one of W1(1)/RI(1) and RI(2)/W2(2)/CQI(2) (or RI(2)/PMI(2)/CQI(2)) is selectively reported.

In the case of periodic CSI reporting, one CSI full reporting may include three reporting instances. In this case, W1 derived from the NP CSI-RS 1 needs to be reported at the first instance.

The CSI derivation from the NP CSI-RS 1 may be construed as always being restricted to the rank 1. In this case, necessary information is preferable beam direction information. Alternatively, for example, the rank 2 or more may be measured/calculated by a UE without restriction to the rank 1. In this case, the meaning of the rank may be re-construed as being an "orthogonal beam number" (hereinafter referred to as an "OBI"). Furthermore, a UE may be improved to report such an OBI to a base station at the W1 reporting instance along with W1. Accordingly, the "restriction to the rank 1" may be construed as having the same meaning as that "OBI=1" is assumed as another expression.

If a UE reports W1 associated with "OBI=2" while reporting "OBI=2", this may be construed as being a meaning that an (greatest) orthogonal beam is included in (DFT) vectors (precoders) belonging to W1 reported from the UE to a base station.

Alternatively, W1 reported along with the OBI may be reported by an OBI value. For example, if "OBI=2", W1 is reported twice (together). The first W1 is to report (neighbor) beams that span one orthogonal beam. The second W1 is to report (neighbor) beams that span another orthogonal beam. A base station that has received such CSI feedback may apply such beam information to a BF CSI-RS as a beam coefficient.

For example, if a BF CSI-RS is configured as 8-ports, a specific beam direction provided in a long-term manner through W1 in a 2-port unit, that is, two cross-pole antenna pairs of the 8-ports, is applied (in common), so beamformed 2-ports may be transmitted. The transmission of a BF CSI-RS may be performed in such a manner that a differently provided specific beam direction is applied to other 2-port pairs and transmitted.

Alternatively, if two BF CSI-RSs or more have been previously configured and a UE has reported "OBI=1", a base station may transmit a specific (e.g., first) BF CSI-RS by applying a beamforming coefficient to the specific BF CSI-RS, and the UE may not measure the other (e.g., second) BF CSI-RS. Alternatively, if the UE has reported "OBI=2", the base station transmits the first and second BF CSI-RSs by applying different beamforming coefficients (derived by a beam direction (e.g., W1) based on "OBI=2") to the first and second BF CSI-RSs, and the UE may measure the first and second BF CSI-RSs. The UE may not measure a BF CSI-RS in addition to the first and second BF CSI-RSs as in the previous example although the BF CSI-RS has been previously configured.

In this case, as in the previous example, when the UE measures the two different BF CSI-RSs if "OBI=2", CSI derivation therefor may be performed as follows:

the UE may perform CSI-RS resource indicator (CRI) reporting (notify that which BF CSI-RS resource is preferred/selected) using the measured BF CSI-RSs and RI/PMI/CQI feedback for the selected BF CSI-RS.

the UE may calculate/obtain/derive a total rank and a PMI (or total composite PMI) and/or integrated CQI for each of the BF CSI-RSs using (some or) all of the measured BF CSI-RSs, and may report them. That is, the UE may perform CSI derivation by jointly taking into consideration all of CSI-RS ports present within a plurality of BF CSI-RS resources not selection between BF CSI-RS resources. For example, the UE may be defined/configured to recognize each BF CSI-RS resource as an individual transmission point (TP) and to perform CSI derivation in a "Transmission point indicated by beam" form. In this case, the total rank may be determined as the sum form of ranks calculated for each measured BF CSI-RS.

The second and third reporting instances may correspond to respective RI reporting and W2/CQI reporting derived from a BF CSI-RS 2. In this case, the period of W1 reporting may be set as an integer multiple of the period of the RI reporting as described above. Even in the subband reporting mode, the reporting sequence may be defined similar to the reporting sequence of necessary CSI types. If the legacy mode 2-1 is reused, only W1 reporting is derived from the NP CSI-RS 1, and the remaining CSI reporting types may be derived from the BF CSI-RS 2. In such a periodic CSI reporting chain, a reporting interval between W1 and another CSI needs to be guaranteed so that it is sufficiently spaced apart in order for a base station to apply the latest reported W1 for BF CSI-RS 2 transmission.

One united/integrated CSI process for joint utilization between an NP and a BF CSI-RS may be designed for efficient CSI reporting having reduced feedback overhead.

2. Joint Utilization Between Different BF CSI-RS Types

Another type of hybrid CSI-RS based on the scheme may correspond to joint utilization between different BF CSI-RSs (Class B). This may be applied/used by configuring the two CSI processes of Rel. 13. More specifically, one CSI process correspond to a CSI process of the class B type having a low duty period when K>1, and the other CSI process corresponds to a CSI process of the class B type in which K=1 and the configuration of a UE-specific BF CSI-RS and a measurement restriction have been activated. In particular, K BF CSI-RS resources having a relatively long period may be configured in the first CSI process of the class B type in which K>1, and one BF CSI-RS resource having a short period may be configured in the second CSI process of the class B type in which K=1.

The CSI feedback of a UE may be independently performed for each CSI process. However, a base station may use a PMI reported through the first CSI process and a CRI corresponding to the PMI in order to apply them to the BF CSI-RS of the second CSI process as beamforming coefficients.

In the case of eFD-MIMO of Rel. 14, for higher efficient CSI reporting, how a hybrid operation of deriving one united/integrated CSI process using such two CSI processes will be optimized needs to be additionally discussed. In this case, contents to be considered are that an actually necessary CSI feedback element from the first CSI process includes PMI information and corresponding CRI information and a CQI is not the actually necessary CSI feedback element. The reason for this is that a CQI reported through the second CSI process actually correspond to a related CQI in the short-term level of CSI about link adaptation.

In the united/integrated CSI process, one possible design for the hybrid CSI-RS is that a hybrid CSI-RS resource may include K+1 BF CSI-RS resources. In this case, the CSI feedback of a UE may be based on a default CSI-RS resource, and CSI reporting may be based on the other/remaining K CSI-RS resources.

Aperiodic CSI reporting in the united/integrated CSI process may be performed based on the results of the latest measurement of the K+1 BF CSI-RS resources. This means that although a CRI reported from K CSI-RSs and a corresponding and applied beam direction have not yet been incorporated into a default BF CSI-RS, but reported CRI information may be used to determine a next beam coefficient to be applied to the default CSI-RS by an operation of a base station.

In the case of periodic CSI reporting, CRI reporting from K CSI-RSs may be added/performed at a separate reporting instance or may be performed along with RI reporting based on a periodic CSI feedback chain for a default BF CSI-RS. That is, basically, a CSI feedback configuration for the united/integrated CSI process may be configured by aiming at CSI reporting for a default CSI-RS (e.g., a CSI-RS having the lowest index or the highest index value). In this case, configuration information, such as a reporting instance for performing typical RI/PMI/CQI reporting may be signaled.

In this case, a UE may calculate a CRI/BI through additional K CSI-RSs, and only a CRI reporting type for reporting the CRI/BI may be separated from a CSI feedback configuration at a separate reporting instance and reported or may be encoded/multiplexed along with another CSI information/type and reported at a specific instance (e.g., RI reporting instance).

FIG. 15 is a flowchart regarding a method for a UE to transmit CSI according to an embodiment of the present invention. The embodiment described above in relation to this flowchart may be applied identically/similarly, and a redundant description thereof is omitted.

A UE may perform one CSI process that has been greatly integrated. The integrated one CSI process may include the following detailed operations.

First, the UE may receive a first CSI-Reference Signal (CSI-RS) associated with a non-precoded CSI-RS resource from a base station (S1510). In other words, the UE may receive the first CSI-RS, configured for the CSI reporting of the class A type, from a base station.

Next, the UE may derive a first Precoding Matrix Indicator (PMI) based on the received first CSI-RS, and may report the derived first PMI to the base station (S1520). In this case, the UE may additionally report a first RI associated with the first PMI along with the first PMI based on the number of layers supported by the UE. For example, if the UE supports up to 2 layers, it does not additionally report the first RI along with the first PMI. If the UE supports up to 8 layers, it may additionally report the first RI along with the first PMI. In this case, the first RI reported along with the first PMI may indicate the rank 1 or the rank 3. Furthermore, if the UE transmits the first PMI, it may transmit it through a Physical Uplink Control Channel (PUCCH) format 2 or 3.

Next, the UE may receive a second CSI-RS associated with one CSI-RS resource of a beamformed CSI-RS type from the base station (S1530). In other words, the UE may receive the second CSI-RS, configured for the CSI reporting of the class B type, from the base station.

Next, the UE may report a second Rank Indicator (RI)/Channel Quality Indicator (CQI)/second PMI, derived based on the second CSI-RS, to the base station (S1540).

In this case, if periodic CSI reporting is triggered in the UE, the reporting period of the first PMI may be configured to be longer than the reporting period of the RI. For example, the reporting period of the first PMI may be configured as an integer multiple of the reporting period of the RI.

Furthermore, the derivation of the first PMI based on the first CSI-RS and the derivation of the second RI/CQI/second PMI based on the second CSI-RS by the UE may be independently performed.

Furthermore, if aperiodic CSI reporting is triggered in the UE, reporting for at least some of the PMI based on the first CSI-RS and the second RI/CQI/second PMI based on the second CSI-RS-based may be selectively triggered.

General Apparatus to which the Present Invention May be Applied

FIG. 16 illustrates a block diagram of a wireless communication apparatus according to an embodiment of the present invention.

Referring to FIG. 16, the wireless communication system includes a base station (eNB) 1610 and a plurality of user equipments (UEs) 1620 located within the region of the eNB 1610.

The eNB 1610 includes a processor 1611, a memory 1612 and a radio frequency unit 1613. The processor 1611 implements the functions, processes and/or methods proposed in the preceding FIGS. The layers of wireless interface protocol may be implemented by the processor 1611. The memory 1612 is connected to the processor 1611, and stores various types of information for driving the processor 1611. The RF unit 1613 is connected to the processor 1611, and transmits and/or receives radio signals.

The UE 1620 includes a processor 1621, a memory 1622 and a radio frequency unit 1623. The processor 1621 implements the functions, processes and/or methods proposed in the preceding FIGS. The layers of wireless interface protocol may be implemented by the processor 1621. The memory 1622 is connected to the processor 1621, and stores various types of information for driving the processor 1621. The RF unit 1623 is connected to the processor 1621, and transmits and/or receives radio signals.

The memories 1612 and 1622 may be located interior or exterior of the processors 1611 and 1621, and may be connected to the processors 1611 and 1621 with well known means. In addition, the eNB 1610 and/or the UE 1620 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

The invention claimed is:

1. A method for a user equipment to transmit Channel State Information (CSI) in a wireless communication system, comprising:
receiving a first CSI-Reference Signal (CSI-RS) associated with a CSI-RS resource of a non-precoded CSI-RS type from a base station;
reporting a first Precoding Matrix Indicator (PMI) derived based on the first CSI-RS to the base station;
receiving a second CSI-RS associated with one CSI-RS resource of a beamformed CSI-RS type from the base station; and
reporting a second Rank Indicator (RI)/Channel Quality Indicator (CQI)/second PMI derived based on the second CSI-RS to the base station,
wherein, when a periodic CSI reporting is triggered, a reporting period of the first PMI is configured as an integer multiple of a reporting period of the second RI and the reporting period of the second RI is configured as the integer multiple of a reporting period of the second PMI,
wherein the reporting the first PMI corresponds to reporting additionally a first RI associated with the first PMI along with the first PMI based on a number of layers supported by the user equipment,
wherein, when the user equipment supports up to two layers, the first RI is not additionally reported along with the first PMI, and
wherein, when the user equipment supports more than two layer, the first RI is additionally reported along with the first PMI.

2. The method of claim 1, wherein a derivation of the first PMI based on the first CSI-RS and a derivation of the second RI/CQI/second PMI based on the second CSI-RS by the user equipment are independently performed.

3. The method of claim 1, wherein the first RI reported along with the first PMI indicates a rank 1 or a rank 3.

4. The method of claim 1, wherein the first PMI is transmitted in a Physical Uplink Control Channel (PUCCH) format 2a or 3.

5. The method of claim 1, wherein, when an aperiodic CSI reporting is triggered, reporting of at least some of the first PMI based on the first CSI-RS and the second RI/CQI/second PMI based on the second CSI-RS is selectively triggered.

6. The method of claim 1, wherein both the non-precoded CSI-RS type and the beamformed CSI-RS type are configured to the user equipment.

7. A user equipment transmitting Channel State Information (CSI) in a wireless communication system, the user equipment comprising:
a Radio Frequency (RF) unit configured to transmit/receive a radio signal; and
a processor configured to control the RF unit,
wherein the processor is further configured to:
receive a first CSI-Reference Signal (CSI-RS) associated with a CSI-RS resource of a non-precoded type from a base station,
report a first Precoding Matrix Indicator (PMI) derived based on the first CSI-RS to the base station,
receive a second CSI-RS associated with one CSI-RS resource of a beamformed CSI-RS type from the base station, and
report a second Rank Indicator (RI)/Channel Quality Indicator (CQI)/second PMI derived based on the second CSI-RS to the base station, and
wherein, when a periodic CSI reporting is triggered, a reporting period of the first PMI is configured as an integer multiple of a reporting period of the second RI and the reporting period of the second RI is configured as the integer multiple of a reporting period of the second PMI,
wherein the reporting the first PMI corresponds to reporting additionally a first RI associated with the first PMI along with the first PMI based on a number of layers supported by the user equipment,
wherein, when the user equipment supports up to two layers, the first RI is not additionally reported along with the first PMI, and
wherein, when the user equipment supports more than two layer, the first RI is additionally reported along with the first PMI.

8. The user equipment of claim 7, wherein a derivation of the first PMI based on the first CSI-RS and a derivation of the second RI/CQI/second PMI based on the second CSI-RS by the user equipment are independently performed.

9. The user equipment of claim 7, wherein the first RI reported along with the first PMI indicates a rank 1 or a rank 3.

10. The user equipment of claim 7, wherein the first PMI is transmitted in a Physical Uplink Control Channel (PUCCH) format 2a or 3.

11. The user equipment of claim 7, wherein, when an aperiodic CSI reporting is triggered, reporting of at least some of the first PMI based on the first CSI-RS and the second RI/CQI/second PMI based on the second CSI-RS is selectively triggered.

12. The user equipment of claim 7, wherein both the non-precoded CSI-RS type and the beamformed CSI-RS type are configured to the user equipment.

* * * * *